United States Patent
Manning et al.

(10) Patent No.: US 9,731,895 B2
(45) Date of Patent: Aug. 15, 2017

(54) AUTOMATED SMART STORAGE OF TEMPERATURE SENSITIVE PRODUCTS

(71) Applicant: TRUMED SYSTEMS, INC., La Jolla, CA (US)

(72) Inventors: Robert James Manning, San Diego, CA (US); Eugene Abraham Baker, Oakland, CA (US); Kevin Lee Bokelman, San Diego, CA (US); Daniel Kline, Encinitas, CA (US); George M. Wohlhieter, Escondido, CA (US); Anthony David Barghini, Encinitas, CA (US); Wesly Hardin Billman, Encinitas, CA (US); Dan J. Dull, Escondido, CA (US); Nicholas James Snyder, Oceanside, CA (US); Mark Majette, San Diego, CA (US)

(73) Assignee: TRUMED SYSTEMS, INC., La Jolla, CA (US)

( * ) Notice: Subject to any disclaimer, the term of this patent is extended or adjusted under 35 U.S.C. 154(b) by 176 days.

(21) Appl. No.: 14/562,756

(22) Filed: Dec. 7, 2014

(65) Prior Publication Data
US 2015/0203297 A1    Jul. 23, 2015

Related U.S. Application Data

(60) Provisional application No. 61/913,247, filed on Dec. 7, 2013.

(51) Int. Cl.
*G06F 7/00* (2006.01)
*B65G 1/137* (2006.01)
(Continued)

(52) U.S. Cl.
CPC ............. *B65G 1/137* (2013.01); *F25D 13/06* (2013.01); *B65G 1/045* (2013.01); *B65G 1/133* (2013.01)

(58) Field of Classification Search
USPC ........................................................ 700/218
See application file for complete search history.

(56) References Cited

U.S. PATENT DOCUMENTS

| | | |
|---|---|---|
| 5,502,944 A | 4/1996 | Kraf et al. |
| 6,003,006 A | 12/1999 | Colella et al. |

(Continued)

FOREIGN PATENT DOCUMENTS

WO    2004005817 A1    1/2004

OTHER PUBLICATIONS

Centers for Disease Control and Prevention (CDC), Guidelines for Maintaining and Managing the Vaccine Cold Chain, MMWR, 2003, 1023-1025,52(42) doi: www.cdc.gov/mmwr/preview/mmwrhtml/mm5242a6.htm (6 pages).

(Continued)

*Primary Examiner* — Kyle Logan
(74) *Attorney, Agent, or Firm* — Acuity Law Group, P.C.; Daniel M. Chambers; Suzan Potuznik

(57) ABSTRACT

Automated cold storage unit and systems for storing, monitoring, and maintaining a supply of temperature sensitive pharmaceutical and/or other products in compliance with regulatory requirements are provided. Such units contain an array of independently addressable holding locations for containers with product in one or more controlled temperature zones fitted with temperature sensors. The units include a reader to track product information and status. Product movement within the unit is performed by a computer-controlled robot. A user interface device, preferably in communication with an application service provider to pro- (Continued)

vide remotely managed inventory management and other services, provides users with secure access to the contents of the unit and associated product data and information.

13 Claims, 25 Drawing Sheets

(51) Int. Cl.
*F25D 13/06* (2006.01)
*B65G 1/04* (2006.01)
*B65G 1/133* (2006.01)

(56) References Cited

U.S. PATENT DOCUMENTS

| | | | |
|---|---|---|---|
| 6,204,763 B1 | 3/2001 | Sone | |
| 6,467,285 B2 | 10/2002 | Felder et al. | |
| 6,490,502 B2 | 12/2002 | Fellows et al. | |
| 6,581,395 B2 | 6/2003 | Felder et al. | |
| 6,658,322 B1 | 12/2003 | Frederick et al. | |
| 6,688,123 B2 | 2/2004 | Felder et al. | |
| 6,735,497 B2 | 5/2004 | Wallace et al. | |
| 6,814,255 B2 | 11/2004 | Liff et al. | |
| 6,874,684 B1 | 4/2005 | Denenberg et al. | |
| 6,941,762 B2 | 9/2005 | Felder et al. | |
| 7,155,306 B2 | 12/2006 | Haitin et al. | |
| 7,196,625 B1 | 3/2007 | Nguyen | |
| 7,228,198 B2 | 6/2007 | Vollm et al. | |
| 7,596,426 B2 | 9/2009 | McGrady et al. | |
| 7,689,316 B1 | 3/2010 | Frederick et al. | |
| 7,689,317 B2 | 3/2010 | McGrady et al. | |
| 7,775,056 B2 | 8/2010 | Lowenstein et al. | |
| 7,844,362 B2 | 11/2010 | Handfield et al. | |
| 7,860,727 B2 | 12/2010 | Showalter et al. | |
| 7,861,540 B2 | 1/2011 | Cloutier et al. | |
| 7,865,263 B2 | 1/2011 | Spano, Jr. et al. | |
| 8,103,379 B2 | 1/2012 | Biba et al. | |
| 8,145,353 B1 | 3/2012 | Cotner | |
| 8,151,598 B2 | 4/2012 | Wittern, Jr. et al. | |
| 8,156,755 B2 | 4/2012 | Murray et al. | |
| 8,170,714 B2 | 5/2012 | Spano, Jr. et al. | |
| 8,176,747 B2 | 5/2012 | Howard et al. | |
| 8,180,485 B2 | 5/2012 | Reckelhoff | |
| 8,210,548 B1 | 7/2012 | Agyemang | |
| 8,281,553 B2 | 10/2012 | Kim | |
| 8,318,499 B2 | 11/2012 | Fritichie et al. | |
| 8,407,068 B2 | 3/2013 | Ohmura et al. | |
| 8,483,867 B2 | 7/2013 | Braun et al. | |
| 2002/0023444 A1 | 2/2002 | Felder | |
| 2004/0115101 A1 | 6/2004 | Malin | |
| 2004/0154322 A1* | 8/2004 | Felder | F25D 25/00 62/177 |
| 2005/0060063 A1 | 3/2005 | Reichelt et al. | |
| 2008/0184719 A1 | 8/2008 | Lowenstein | |
| 2009/0188272 A1 | 7/2009 | Cloutier et al. | |
| 2009/0231132 A1 | 9/2009 | Shoenfeld | |
| 2010/0275625 A1 | 11/2010 | Lowenstein | |
| 2010/0300130 A1 | 12/2010 | Shoenfeld et al. | |
| 2010/0303590 A1 | 12/2010 | Pedrazzini | |
| 2011/0304466 A1* | 12/2011 | Bair, III | F25D 29/008 340/585 |
| 2013/0199232 A1 | 8/2013 | Natarajan | |
| 2014/0165614 A1* | 6/2014 | Manning | F25D 29/00 62/62 |

OTHER PUBLICATIONS

IDBLUE, IDBLUE Introduces Next-Generation UHF Mobile RFID Reader for Smartphones and Tablets, 2015, doi: http://idblue.com/idblue-introduces-next-generation-uhf-mobi le-rfid-reader-for-smartphones-and-tablets (1 page).
Lumidigm, Mercury Series OEM Module, 2011, doi: http://lumid1.hdev1.com/mercury-series-oem-module/ (2 pages).
MagTek®, MagTek Mini—Magstripe Card Reader—swipe, doi: http://www.magtek.comN2/products/secure-card-reader-authenticators/mini.asp# (1 page).
Motorola, Symbol LS3008 Rugged Handheld Scanner Specification Sheet, 2012, doi: http://www.barcode-store. com/pdf/ls3008.pdf.
NetSuite, Inc. ASP hosted services ERP, doi.: http://www.netsuite.com/portal/resource/articles/erp/what-is-erp.shtml.
NetSuite, Inc. ASP hosted services, CRM, doi.: http://www.netsuite.com/portal/resource/articles/crm/what-is-crm.shtml.
Oracle Retail Trade Management (RTM), doi.: https://www.oracle.com/industries/retail/products/merchandise-management/trade-management/index.html.
Sample Access Manager, "SAM", by Hamilton Company USA, 4970 Energy Way Reno, Nevada 89502. dol.: www. hamilton-storage.com/automated-samplestorage/20c-80c-biobanking/low-capacity/ Document accessed Mar. 7, 2014.
World Health Organization (WHO), WHO Expert Committee on Specifications for Pharmaceutical Preparations, WHO Technical Report Series 961, 2011, 1-440, 45th Report, doi: http://whqlibdoc.who.intltrsIWHO_TRS_961_eng.pdf?ua=1.

* cited by examiner

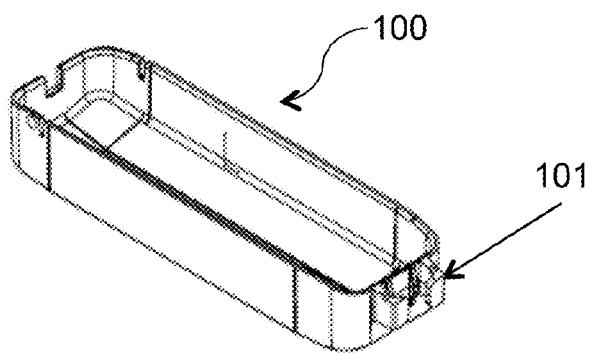
FIG. 1A
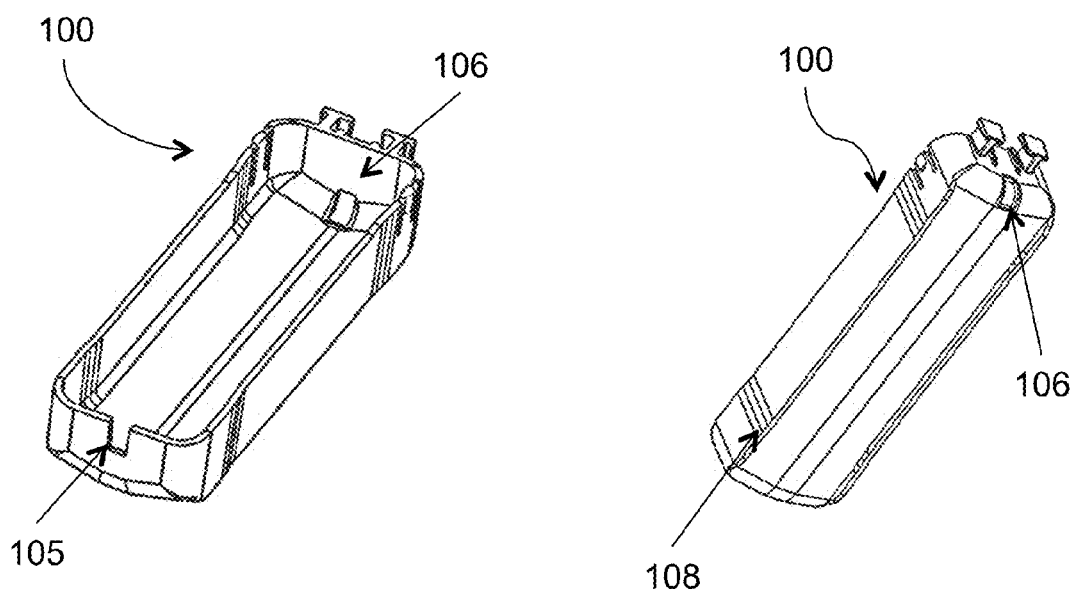
FIG. 1B
FIG. 1C

| Product | QTY | EXP  | Location     | Temp   |
|---------|-----|------|--------------|--------|
| A       | 5   | 2/13 | Refrigerator | 5 oC   |
| B       | 6   | 2/12 | Freezer      | -25 oC |

Expiration Alert:
 n Doses of Product A will expire in x days (mm/dd/yy)

Stockout Alert:
 Product C is currently stocked out
       (order placed on mm/dd/yy)

1000

AUTOMATED SMART STORAGE OF TEMPERATURE SENSITIVE PRODUCTS

RELATED APPLICATION

This application claims the benefit of and priority to U.S. provisional patent application Ser. No. 61/913,247, filed 7 Dec. 2013, the contents of which are incorporated by reference in their entirety for any and all purposes.

FIELD OF THE INVENTION

The present invention relates generally to automated storage and inventory management of temperature sensitive products, including pharmaceuticals (including small molecule and biologic drugs and drug candidates), veterinary medicines, research reagents, and the like.

BACKGROUND OF THE INVENTION

1. Introduction

The following description includes information that may be useful in understanding the present invention. It is not an admission that any such information is prior art, or relevant, to the presently claimed inventions, or that any publication specifically or implicitly referenced is prior art.

2. Background

Many pharmaceutical and other temperature sensitive products depend upon proper storage, with temperature being one of the key parameters that determines if a product is suitable for use or should be discarded as expired or spoiled. Some pharmaceutical and other temperature sensitive product formulations require a storage temperature of about 5° C. and lose effectiveness and potency when stored at temperatures below freezing, while others require subzero storage. Generally, effectiveness and potency decrease with every freeze-thaw cycle. This is especially true for immunobiologics such as vaccines.

Concern over the proper storage of vaccines and awareness that exposure of vaccines to temperatures outside the recommended ranges can have adverse effect on potency, thereby reducing protection from vaccine-preventable diseases, prompted the Centers for Disease Control and Prevention (CDC) to establish, "Guidelines for Maintaining and Managing the Vaccine Cold Chain" (www.cdc.gov/mmwr/preview/mmwrhtml/mm5242a6.htm). The CDC emphasizes that administration of potent immunobiologics is not only dependent on an effective cold storage unit, it also requires maintaining accurate temperature logs while the vaccine is in storage prior to use. Due to significant variability of temperatures within a compartment of a conventional vaccine refrigerator or other storage device, it is recommended that temperatures be recorded near the actual container of the pharmaceutical several times per day. Vaccines whose storage conditions experience one or more temperature excursions outside of the recommended temperature range should be immediately separated from the stock of effective vaccines so to avoid dispensing a potentially ineffective product.

The high cost of biologic pharmaceuticals further highlights the need for cold storage unit for the storage of pharmaceuticals with accurately maintained temperature zones, sensors for the recordation of temperatures surrounding the pharmaceutical product, and an alert system that assures responsive transfer of product to an alternate location in the machine in case of, for example, a unit malfunction or power failure that results in an unacceptable temperature excursion in the product's storage compartment, removal of units of expired and/or ineffective products stored in the machine, regulatory recalls, or other commercial or regulatory reasons. A further need arises to simplify the management of cold storage units and their contents and to maintain an optimal inventory of the temperature sensitive products stored therein, e.g., pharmaceutical products. This invention addresses these and other needs.

SUMMARY OF THE INVENTION

This invention provides automated cold storage unit for the storage of one or more different types of temperature sensitive products, for example, pharmaceuticals, vaccines, and research reagents, as well as inventory management systems to manage the storage, stocking, and dispensing of temperature sensitive products (preferably in compliance with regulatory requirements applicable to such products, if any), and the data associated with such storage, stocking, and dispensing. Thus, objects of the invention include providing smart (i.e., automated, computer-controlled) cold storage units, systems, and methods that provide proper storage of pharmaceuticals and other temperature sensitive products and simplify associated inventory and data management protocols, Furthermore, the associated data and information generated in the use of such cold storage units and systems allow for the more efficient, optimized product stocking of cold storage units within such systems, in addition to enabling billing and marketing efficiencies for users (e.g., healthcare providers, pharmacists, scientists, etc.) and sellers (e.g., drug companies, research reagent suppliers, etc.) of temperature sensitive products stocked and stored in such units and systems.

Thus, in one aspect the invention provides for automated temperature sensitive product cold storage units. Such units include a housing, a loading zone, a robot to transport temperature sensitive products to and from different locations in the cold storage unit, one or more accessible, insulated, temperature-controlled cold storage zones, a storage area framework having independently addressable storage bays for storing products, a reader to scan temperature sensitive product information, one or more refrigeration units connected to the cold storage zone(s), and a computer that controls operation of the cold storage unit and its components.

In some embodiments, the loading zone is disposed in a carousel that moves in relation to the access panel, as well as in relation to a base upon which it may sit. In some preferred embodiments where in the storage area framework is, for example, a cylindrical array having a hollow central core and a series of stacked levels of preferably rectangular storage bays disposed about the periphery of each level, the carousel is circular and can rotates atop a base disposed atop the storage area framework.

The storage bays of the storage area framework are accessible to the robot(s) in the cold storage unit. In those embodiments that employ cylindrically arrayed storage area frameworks, R, Θ, Z gantry robots are preferred. As will be appreciated, in such configurations an R, Θ, Z gantry robot can be centrally positioned in the cylinder's hollow core so as to provide easy, efficient access to each storage bay.

In preferred embodiments, the cold storage unit comprises a plurality of accessible, insulated, temperature-controlled cold storage zones each of which includes at least one temperature sensor. Robotic access between the different cold storage zones is provided through any suitable resealable structure, for example, key way seal and plug, that prevents temperature excursions outside of preset limits when a portion of a robot transits between different cold storage zones The cold storage zone(s) preferably provide storage temperatures between about 1° C. to about 12° C., about 2° C. to about 8° C., about −100° C. to about 0° C., about −80° C. to about −5° C., and/or between about −50° C. to about −15° C. The unit includes refrigeration equipment: forced air cooling over evaporator, condenser, freezer circulation fans and a compressor and also preferably include one or more of the following a backup power supply, a reader that is a barcode reader; an optionally activated security interface to control internal access to the cold storage unit, and an air duct that included a stepper motor located within a cold air intake chamber above a slide valve to prevent freezing of the slide valve.

The cold storage units of the invention also include one or more computers to control its operation. In preferred embodiments, the computer also collects, processes, and stores data and/or other information associated with the operation of the cold storage unit and the temperature sensitive products stored therein. In preferred embodiments, the computer is a user interface device (UID), e.g., a tablet computer, while in other embodiments, the cold storage unit comprises a dedicated computer and a UID serves as a computer peripheral that communicates with the dedicated computer.

Another aspect of the invention concerns automated management systems for temperature sensitive products. Such systems comprise one or more automated cold storage units according to the invention in communication with an application service provider (ASP), for example, a cloud-based hosted environment that facilitates such services as inventory management, system administration, alerting, and/or and reporting.

A further aspect of the invention relates to methods of managing a temperature sensitive product inventory used in conjunction with a temperature sensitive product cold storage unit and/or automated management systems for temperature sensitive products according to the invention.

Other objects, aspects, embodiments, features, and advantages of the invention will be apparent from the following description, drawings, and claims.

BRIEF DESCRIPTION OF THE DRAWINGS

FIG. 1A-FIG. 1C depict perspective views of an exemplary carrier.

Figure 2A:
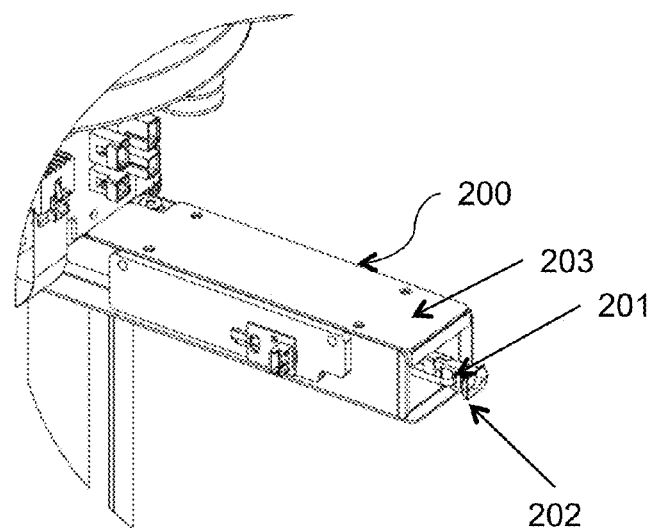
FIG. 2A provides a perspective view of a robotic arm of a R, Θ, Z gantry robot.

As those in the art will appreciate, the following detailed description describes certain preferred embodiments of the invention in detail, and is thus only representative and does not depict the actual scope of the invention. Before describing the present invention in detail, it is understood that the invention is not limited to the particular aspects and embodiments described, as these may vary. It is also to be understood that the terminology used herein is for the purpose of describing particular embodiments only, and is not intended to limit the scope of the invention defined by the appended claims.

DETAILED DESCRIPTION OF THE INVENTION

The contents of this Detailed Description are organized, for clarity and not by way of limitation, under the following headings: Definitions; Overview; Representative Embodiments: Cold Storage Unit; User Interface device (UID); Reader; Application Service Provider (ASP); Alerts; and Inventory Management.

Definitions

Unless defined otherwise, all technical and scientific terms used herein have the same meaning as is commonly understood by one of skill in the art to which this invention belongs. All patents and publications referred to herein are, unless noted otherwise, incorporated by reference in their entirety. In the event a definition in this section is not consistent with definitions elsewhere, the definition set forth in this section will control.

As used herein, "cold storage unit" refers to an appliance that cools the interior compartments to temperatures below the ambient temperature of the room, is designed for the storage of temperature sensitive products, including pharmaceutical products, in compliance with regulatory requirements, and is fitted with sensors, devices and a computer as described hereinafter. The cold storage unit contains compartments above zero ° C. (0° C.) and may or may not provide a freezer compartment with temperatures below 0° C. It is a low humidity, frost free, cold storage unit with calibrated temperature monitoring sensors located at a point or points within the compartments which most accurately represents the temperature profile of the pharmaceutical product, is equipped with alarms to indicate temperature excursions and/or refrigeration failure, and has lockable doors meeting the guidelines of the World Health Organization (WHO), as described in "WHO Expert Committee on Specifications for Pharmaceutical Preparations", WHO technical Report Series 961, 2011 (Report found on www.who.int/en/).

As used herein, "automated smart cold storage" refers to a cold storage unit which provides automatic handling of the products stored within, a computer in communication with an Application Service Provider (ASP) and is designed for storing, monitoring, and maintaining a supply of temperature sensitive products, including pharmaceutical products, as described herein.

As used herein, "gantry robot" refers to a R, Θ, Z, gantry robot with motion of two horizontal arms along a central shaft in the vertical Z axis, a 365° Theta rotation of the arms about the Z axis and radial, R, extension of the arms perpendicular to the Z axis.

As used herein, "carrier" refers to a product-holding container designed to be moved by a gantry or other robot and to securely but removeably fit into a storage bay in a cold storage unit. Preferably, a carrier is designed to hold one product type that may come, for example, in the form of a vial, two vials, a syringe, a tube, or a package. When multiple product types are to be stored in a particular cold storage unit, carriers designed to hold the different products types are utilized. Unlike a carrier, a "retainer" is not meant to be moved by a robot. Instead, it is affixed at particular location in the cold storage unit, for example in a storage bay, the loading zone, etc., and is designed to securely hold or retain a product in a particular location until a robot moves it to another location, e.g., to another retainer or to a carrier.

As used herein, "cleanable surface" of a cold storage is made of materials that are acceptable in a medical environment and can be cleaned and/or wiped with sterilization and/or cleaning chemicals and cloths as required by WHO regulation or best practice methods. The material is a durable, corrosion free material such as stainless steel, hard plastic or resin, and the surface is smooth with minimal number of seams.

As used herein, "Automatic Identification and Data Capture" (AIDC) refers to methods of automatically identifying objects using a device that collects data about the object and transfers the data directly into computer systems. Technologies typically considered as part of AIDC include bar code readers, Radio Frequency Identification (RFID), biometric scanners, magnetic strip reader, Optical Character Recognition (OCR), smart cards, and voice recognition.

As used herein, "reader" is a device used to obtain the identity of, and information related to, a specific product, using a method referred to as Automatic Identification and Data Capture (AIDC), by scanning, detecting, or capturing an image of a product in order to identify embedded information on the product.

As used herein, a "camera" may be used as a reader device to capture an image of a product with the portion displaying a barcode. The camera transfers the data to the UID for analysis by barcode recognition software (see, e.g. Barcode Xpress available from m-Surf Lab at http://www.msurflab.com/).

As used herein, "barcode" refers to an optical symbol, machine readable, containing information about the product on which it is displayed. The barcode may be one dimensional, a collection of bars of various widths representing the descriptive characters, two dimensional collection of symbols for example known as a Quick Response Code (QR), or three dimensional, where for example a 2D image includes color and further expands the amount of information captured.

As used herein, "barcode reader" refers to an electronic device specifically designed for reading printed barcodes. The reader may use ambient light and light sensors to capture the image of the barcode or it may consists of a light source, a lens and a light sensor translating optical impulses into electrical ones. Additionally, nearly all barcode readers contain decoder circuitry analyzing the barcode's image data provided by the sensor and sending the barcode's content to the scanner's output port (see, e.g., The LS3008 rugged handheld scanner by Motorola designed for the healthcare industry or the Motorola SE330X which can be integrated into a device, on the Motorola web site at www.motorola.com).

As used herein, "Radio-frequency identification" (RFID) refers to a reader that uses radio-frequency electromagnetic fields to transfer data from a tag attached to a product for the purposes of automatic identification and tracking. The tag does not require a battery as it is powered by the electromagnetic fields used to read them. The tag contains electronically stored information which can be read from up to several meters away. Unlike a bar code, the tag does not need to be within line of sight of the reader and may be embedded in the tracked object (see, e.g. UHF Mobile RFID Reader for Smartphones and Tablets, by IDBLUE at www.idblue.com).

As used herein, "magnetic strip reader" or "magnetic card reader" refers to a device with a guide for swiping and reading a magnetic card for example containing an access identification code of the designated user. Exemplary devices include MagTek Mini Swipe Magnetic Strip Reader, available from MAGTEK® (see, e.g. magtek.com) where data is sent to the UID via a USB port and may be viewed in applications such as Windows® Notepad without requiring additional drivers or application programming.

As used herein, "biometricreader" refers to a reader that uses for example a fingerprint or a retinal or facial recognition scan as a security measure to identify an authorized user of a cold storage unit. For example a finger print recognition controlled access implements a finger print scanner, embedded in the user interface device, and software to analyze the scan. Scanners and software are readily available (see e.g. Mercury™ Series OEM Module from Lumidigm at www.lumidigm.com).

As used herein, "cell phone card" refers to a cellular network card that provides access to the internet. Cell phone cards are available and known to those of skill in the art.

As used herein, "user interface device" (UID) is a computer in communication with the cold storage unit components and an ASP and is docked, or mounted, in a docking station connected to or embedded in the unit. The UID contains wired and wireless network adapter cards and remains fully functional when docked or undocked maintaining communications with the unit via a short range wireless communication device embedded in the unit. The UID, preferably a touch screen computer with a virtual onscreen keyboard, can access the internet via a wireless link to a local wireless network, a wireless communication through a cell phone card embedded in the unit, or a cable connection through a docking station. The UID contains an operating system and software required to capture data from sensors and readers on or within the cold storage unit, send and receive data from an ASP, capture manually entered data, and display information.

As used herein, "tablet" refers to a self-contained computer with a wireless or wired internet connectivity that uses a touch screen with virtual keyboard capabilities for data access and entry.

As used herein, "Wireless" refers to a type of communication in which power and/or data is transferred over a distance without the use of electrical conductors or wires. For example, electromagnetic waves, light waves, or acoustic waves can be used to carry power and/or data over a distance without using electrical conductors or wires.

As used herein, "cloud-based host" refers to a third party provider server farm located in a centralized location, away from the individual cold storage units, implemented as a service, maintaining communications with individual computers and users via the web. The data, software and programming are centralized on the server farm.

As used herein, "Application Service Provider" ("ASP") refers to a cloud-based hosted environment business that provides computer-based services to customers over a network. A user requires only a browser and an internet/intranet connection on their desktop, laptop, or other network access appliance to obtain substantially complete secure access to that system. Software offered using an ASP model is also sometimes called on-demand software or software as a service (SaaS) and may be accessed using standard protocol such as Hypertext Transfer Protocol (HTTP), foundation of data communication for the World Wide Web (see, e.g., ASP hosted services provided by NetSuite, Inc. of San Mateo, Calif. such as NetSuite™, Oracle® Small Business Suite, NetCRM™, and NetERP™, descriptions of which can be found at www.netsuite.com).

The ASP utilizes one or more software application programs, routines or modules configured to be executed by a general purpose microprocessor, in one or more hardware devices, such as a programmable logic controller (PLC). The user benefits from having access to highly specialized software without the cost of purchasing, servicing and upgrading the software as well as access to ASP provided information and resources related to the products.

A used herein, "service provider" refers to a business that oversees and maintains the automated cold storage system in all its functions as described herein.

As used herein a "product descriptor", refers to product information generated by the ASP provided software that combines data received from the UID and information available from product manufacturer. Product descriptor information includes for example: product name and dosage, lot numbers and associated expiration date, recommended temperature for storage, and compartment location.

As used herein, "HL7" refers to a data format adapted by the healthcare industry for sharing information within the health care field. The document format is developed by Health Level Seven (HL7), a non-profit organization involved in the development of international healthcare informatics interoperability standards.

As used herein, "Electronic data interchange" or "EDI" refers to a data format adapted for communication between a healthcare provider and a vendor for example. EDI is the structured transmission of data between organizations by electronic means and without human intervention as defined by the National Institute of Standards and Technology.

As used herein, a "HIPPA" refers to "The Health Insurance Portability and Accountability Act of 1996" wherein it protects the privacy of individually identifiable health information; the HIPAA Security Rule, which sets national standards for the security of electronic protected health information.

As used herein, "regulatory requirements" refers to the regulations related to a cold storage unit for storage of temperature sensitive pharmaceutical products as defined by the World Health Organization (WHO) qualification requirements for cold storage of Time and Temperature Sensitive Pharmaceutical Products (TTSPP) (see, "WHO Expert Committee on Specifications for Pharmaceutical Preparations", WHO technical Report Series 961, 2011 available at www.who.int/).

As used herein, a "web site" is a set of related web pages containing content such as text, images, video, audio, etc. A website is hosted on at least one web server, accessible via a network such as the Internet or a private local area network through an Internet address known as a Uniform Resource Locator. All publicly accessible websites collectively constitute the World Wide Web.

As used herein, "par level" is a predetermined inventory level of a specific product. When ordering or re-ordering product the goal is to increase inventory to the predetermined par level. The predetermined par level takes into consideration the physical maximum quantity of the specific product that can be physically accommodated by the storage unit, the shelf life of the product, and historical product dispense records.

As used herein, "re-order point" is the inventory level at which a re-order message is generated. The re-order point takes into account lead time for dispense rate, order processing, and product delivery in order to avoid stocking out of the product. The re-order point quantity of product to be ordered is determined by the difference between current inventory and the predetermined par level.

As used herein, "critical low" is an inventory level whereby a re-order would not arrive in time to avoid a zero count of stock, "stock-out", based on expected dispense rate, and manual intervention such as placing an overnight shipping order may be required.

As used herein, "biologic" is a pharmaceutical product composed of sugars, lipids, peptides, proteins, nucleic acids or combinations of these substances and may be a vaccine, blood or a blood component, allergenic, somatic cell, gene therapeutic product, recombinant therapeutic protein or nucleic acid, or living cells that are used as therapeutics to treat diseases.

As used herein, "potency" is a measure of the pharmaceutical product activity expressed in terms of the amount required to produce an effect of given intensity. Exposure to improper storage temperatures may decrease potency of a pharmaceutical product due to decomposition and/or denaturation of the product and/or by destabilizing the formulation of the product.

As used herein, "effectiveness" refers to the ability of a pharmaceutical to produce a beneficial effect.

The "Centers for Disease Control and Prevention" (CDC), a division of Department of Health and Human Services, which among its many roles also provides guidelines for proper handling and storage of vaccines. The guidelines may be found at www.cdc.gov/mmwr/preview/mmwrhtml/mm5242a6.htm.

As used herein, "point of care" is a location at or near the location where the pharmaceutical product is administered to a patient. Locations may include a physician's office, a physicians practice group suite, a clinic, a pharmacy, and a hospital.

As used herein, "business hours" refer to a time period of the day when pharmaceuticals are administered to patients and the cold storage unit is likely to be opened frequently.

A "plurality" means more than one.

A "patentable" method, machine, or article of manufacture according to the invention means that the subject matter satisfies all statutory requirements for patentability at the time the analysis is performed. For example, with regard to novelty, non-obviousness, or the like, if later investigation reveals that one or more claims encompass one or more embodiments that would negate novelty, non-obviousness, etc., the claim(s), being limited by definition to "patentable" embodiments, specifically exclude the unpatentable embodiment(s). Also, the claims appended hereto are to be interpreted both to provide the broadest reasonable scope, as well as to preserve their validity. Furthermore, if one or more of the statutory requirements for patentability are amended or if the legal standards change for assessing whether a particular statutory requirement for patentability is satisfied between the time this application is filed or issues as a patent to a time the validity of one or more of the appended claims is considered in a post-issuance proceeding, the claims are to be interpreted in a way that (1) maximally seeks to preserves their validity and (2) provides the broadest reasonable interpretation under the circumstances.

Overview

As described above, the invention provides for smart, automated temperature sensitive product cold storage units, networked systems that utilize such cold storage units, and methods of using such cold storage units and systems. One aspect of the invention concerns the cold storage units themselves. Such units include a housing having at least one product access panel for accessing a loading zone to load and/or retrieve temperature sensitive products stored in the cold storage unit, although in some embodiments, the cold storage unit can include a loading zone for loading products and different loading zone for unloading products. In such embodiments, the loading and unloading zones may be accessed through the same or different access panels, depending on the design configuration of the particular cold storage unit. The access panel(s) are preferably sealed airtight when closed in order to help maintain temperature control inside the housing.

Inside the housing, a user accesses a loading zone through an access panel, which may comprise one or more doors. Access panels having a pair of sliding doors positioned above the loading zone are particularly preferred, wherein the doors preferably slidingly separate from a central point above the associated loading zone.

In the invention, an access panel is configured to allow passage of temperature sensitive products (by loading or unloading) between the environment outside the cold storage unit and the housing interior. When an access panel is opened, the resulting opening or access port allows user access to a loading zone associated therewith (permanently or temporarily) in the cold storage unit's interior. Through the access port a user can directly load or unload products into or from the associated loading zone. In preferred embodiments, a user loads or unloads a product from a carrier in the loading zone that facilitates robot-mediated movement of the product inside the storage unit.

The cold storage units of the invention include at least one reader (e.g., a barcode reader, a camera, an RFID detector, magnetic strip reader, etc.) to read information on the product, typically on the product's label. In preferred embodiments, a reader is positioned inside the housing near the access panel and associated loading zone in order to read information from products being loaded into and being withdrawn from a cold storage unit. In some embodiments, a reader is positioned outside or on the exterior of the cold storage unit's housing.

A carrier carries and holds temperature sensitive products to be loaded into, stored, and removed from in the cold storage unit. Each carrier is preferably designed not only to hold a temperature sensitive product, which may be configured as, for example, a syringe or vial containing a liquid pharmaceutical product, two vials, a first vial that contains a lyophilized pharmaceutical product and a second vial that contains a diluent for the product, a tube containing a temperature sensitive research reagent composition (e.g., a restriction enzyme), but also to be picked up or otherwise engaged by a robot for transport within the cold storage unit. Examples of a structure useful for engaging the end-effector of a robot arm is a latch or catch configured to be releasably but connectedly engaged by a complementary adaptor positioned at the end of the arm.

Empty carriers may be preloaded in the machine so that they appear in the loading zone ready for a temperature sensitive product to be loaded therein, or they may be added to an empty space in the loading zone prior to or after a product is placed therein, for example, by a user after the access panel is opened.

In some embodiments, a loading zone is disposed on a driven carousel that moves in relation to the access panel, as well as in relation to a base upon which it may sit. In many such embodiments, not all of the product holding locations (e.g., carriers or retainers) on the carousel are accessible to a user when the associated access panel is open. Depending on the design of the cold storage unit, the carousel may or may not move when an associated access panel is open in order to expose more holding location. In some preferred embodiments where the storage area framework is, for example, a cylindrical array having a hollow central core and a number of stacked levels of storage bays disposed about the periphery of each level, the carousel can rotate atop a base disposed atop the storage area framework.

Optionally each holding position within the access zone of the carousel is fitted with a sensor to detect the presence of a product within a carrier or a retainer. In such embodiments, the sensor includes a light beam generator and the carriers include at least one opening through which a light beam can be shone and/or reflected to assess whether the carrier contains a temperature sensitive product.

In the invention one or more industrial robots transport a temperature sensitive product, either carried in a carrier or removed from a retainer, to different locations inside the cold storage unit, for example, from a loading zone to a location for temporary or long term storage in the cold storage unit. Any suitable industrial robot may be employed, including those that are electrically, hydraulically, or pneumatically driven.

Typically, a robot used in the invention will have at least one, and preferably two or more, arms. The end of each arm preferably has a gripper or end-effector to grasp or hold a carrier or temperature sensitive product. The degrees of freedom of the end-effector will depend on many factors, including whether it is intended to grasp or hold a carrier or temperature sensitive product. Similarly, a robot's accuracy, repeatability, resolution, cycle time, speed, working envelope, and other operating parameters will depend on the particular application and cold storage design, and are well within the skill of those in the art.

In preferred embodiments, the robot is an R, Θ, Z gantry robot, preferably an R, Θ, Z gantry robot centrally disposed in a hollow core of a cylindrically arrayed storage area framework having multiple levels and multiple storage bays on each level. Such a robot preferably has a pair of robotic arms that can move vertically along a central shaft that defines a Z axis of the gantry robot. The robotic arms rotate in relation to the storage area framework to place or retrieve temperature sensitive products, or carriers therefore (be they empty or loaded with a temperature sensitive product), to and from the loading zone and/or a different storage bay. In particularly preferred embodiments, the robot has two opposing arms, 180° apart. Each arm has a central rod positioned within a rectangular sleeve casing and its distal end is fitted with an adaptor (end-effector) configured to hook and pull a carrier into the arm's sleeve casing after forming a fit with a latch on the carrier. Optionally, each arm is fitted with a sensor to detect the presence and location of a carrier or retainer with the storage bay. Any suitable sensor can be used, and will be adapted for the particular application. In some embodiments, the sensor includes a light beam generator and a reflected light detector that communicate with the storage unit's computer in order to control horizontal and vertical movement of the central rod to guide connection with the latch on a carrier.

In other embodiments of the invention, one or more linear or Cartesian coordinate robots are used to transport carriers or temperature sensitive products. The storage area framework in such cold storage units are typically rectangular towers having multiple levels with multiple storage bays accessible to the robot on each level. The arm of such a such robot equipped with an end-effector also preferably includes a sensors to detect a product or carrier and whether the carrier is loaded with a product.

A storage area framework is a structure designed to have a number of independently addressable locations, i.e., storage bays, on at least one, and preferably 2 or more, levels such that each location can be readily accessed by the robot. Temperature sensitive products are stored within storage bays in one or more storage area frameworks in cold storage units of the invention. Each storage bay is accessible to a robot in the cold storage unit intended to transport carriers and/or products within its working envelope. In this way, a particular unit of a temperature sensitive product can be stored and later retrieved, be it to make the product available to a user at a loading zone or to otherwise move a product from one location to another in the cold storage unit, for example, from a storage bay in one temperature-controlled cold storage zone to another (e.g., to provide for a faster product retrieval time in response to a user request, to move an expired product to a different location in the cold storage unit, etc.). Storage bays can also be designed to accommodate one carrier or more than one carrier. Those designed to store more than one carrier, typically placed in nose-to-tail fashion such that the end of each carrier designed to be engaged by the end-effector of the robotic arm faces the storage bay opening that faces the robot. In such embodiments, the cold storage unit will include at least one, and preferably a number of storage bays or other storage locations designed for only transient carrier or product storage and thus generally unoccupied. Alternatively, one or more multi-carrier/product storage bays may contain fewer than the maximum number of carriers/products it is designed to accommodate. In this way, the robot can access a carrier (or product) stored behind another product or carrier in a particular storage bay by first moving the (those) carrier(s) nearest the robot to another location before returning to retrieve the targeted carrier or temperature sensitive product.

Generally, a cold storage unit of the invention has one storage area framework. In those embodiments that have two or more cold storage zones, the framework includes an insulating layer between each cold storage zones, whereas in embodiments having two or more frameworks, they may each be disposed in the corresponding cold storage zone.

The storage area framework(s) can have any suitable configuration, which will be dictated by design considerations such as unit size, energy efficiency, and cost, the type of temperature sensitive products to be stored (e.g., pharmaceuticals, research reagents, etc.), number of maximum number of products to be stored, the number of temperature-controlled cold storage zones that are to be included in the cold storage unit, whether one or more of the temperature-controlled cold storage zones will provide for subzero storage, the type and number of robot(s) to be used, etc.

A number of presently preferred embodiments concern storage area frameworks constructed as cylindrical arrays having a hollow core and series of levels each having a plurality of preferably rectangular storage bays disposed about the cylinder's outer periphery. Such a design works efficiently with a R, Θ, Z gantry robot positioned about the cylinder's central axis, as the robot can freely move in the hollow core. In such arrays, the storage bays may be arrayed vertically, or they may be offset. Arraying the storage bays vertically allows the framework to be comprised of a series of substantially parallel vertical members spaced horizontally to accommodate the width of the carriers used. Horizontal supporting members can be placed at fewer than every level in order to stabilize the vertical members. For example, horizontal members may be placed at every second, third, fourth, fifth, sixth seventh, eight, ninth, or tenth level, or even less frequently, although placing them at every level is also within the scope of the invention, as is omitting them, for example, from every third, fourth, fifth, sixth seventh, eight, ninth, or tenth level, or even less frequently.

Arraying storage bays vertically also allows each of the plurality of storage bays to define a rectangular box open at least at the end that faces the robot capable of inserting and removing a temperature sensitive product or carrier therefor into or from the storage bay, as the case may be. Each such storage bay may optionally comprise a series of spaced, substantially parallel vertical members that contain ridges to engage and suspend carriers for temperature sensitive products.

In other embodiments, the storage bays have floors that a carrier can rest on after it is inserted into a storage bay by a robot.

Cold storage units of the invention include at least one accessible, insulated, temperature-controlled cold storage zone that includes at least one temperature sensor, and often, 2, 3, 4, 5, or more such sensors. The cold storage zone(s) preferably provide storage temperatures between about 1° C. to about 12° C., about 2° C. to about 8° C., about −100° C. to about 0° C., about −80° C. to about −5° C., and/or between about −50° C. to about −15° C. In some embodiments, a cold storage unit according to the invention includes two or more accessible, insulated, temperature-controlled cold storage zones, each of which bounds a different volume within the cold storage unit and encloses a portion of the plurality of storage bays in the storage area framework separate from the other cold storage zone(s).

Cold storage units according to the invention further include one or more refrigeration units to provide the desired temperatures in the cold storage zone(s) of the machine. Any suitable refrigeration unit(s) may be selected, and selection will depend on various factors known in the art, including the cold temperatures to be attained, the size of the cold storage unit and its cold storage zone(s), component configuration, installation location for the cold storage unit, etc. Cold storage zones thermally communicate with a refrigeration unit through ductwork. In preferred embodiments, the cold storage unit includes an air duct that includes a stepper motor located within a cold air intake chamber above a slide valve to prevent freezing of the slide valve.

In particularly preferred embodiments, a cold storage unit includes a plurality of stacked, accessible, insulated, temperature-controlled cold storage zones each having at least one temperature sensor and bounding a volume that encloses a portion of the plurality of storage bays in the storage area framework separate from the other cold storage zone(s). In these embodiments, any two adjacent cold storage zones are connected by a suitable resealable structure that prevents temperature variations in the adjacent, connected cold storage zones. In this way, 2, 3, 4, or more different cold storage zones can be connected such that accurate temperature control can be maintained in each zone.

One example of such a structure suitable for allowing a single robot to traverse two or more cold storage zones utilizes a keyway insulation ring, key way seal and key way plug to physically and thermally separate, and provide access between, two adjacent cold storage zones. The key way seal is designed to form a seal with, and fit within the grooves of, a keyway insulation ring, fused with an insulation layer between the two adjacent cold storage zones. The key way plug optionally comprises a disk that sits on the key way seal within the insulation layer to form an insulating barrier between the two adjacent cold storage zones. Moreover, the key way plug is free to rotate with the robot when the robot is an R, Θ, Z gantry robot.

Cold storage units according to the invention also preferably include a backup power supply, preferably one powered by one or more batteries, preferably rechargeable batteries. The unit's computer preferably monitors the status (e.g., charge level) of back-up power supply to ensure it will function in the event of a power failure.

Cold storage units of the invention may also include an optionally activated security interface to control internal access to the cold storage unit. Such access control preferably requires a login code verification and/or a biometric sensor scan, in which event an interface is provided for entry of a login code and/or a biometric reader is provided to acquire biometric data from a user for subsequent verification.

The automated cold storage units of the invention employ one or more computers to control operation of the storage unit and its various components, to monitor and record data and information about the performance of the storage unit and its various components and temperature sensitive products stored therein, and to display such data and information, or selected portions thereof, to users of the cold storage device and other interested parties. In preferred embodiments, such data and information is collected from multiple cold storage units according to the invention that comprise a network. Such network can be a local or wide area network. Connection between the various network elements (e.g., cold storage units, servers, and the like) are typically over an Internet network and may include other telecommunications network routes of communications.

In a cold storage unit of the invention, computing power is provided by one or several different but linked computers. In some embodiments, the computer is housed within the storage unit housing. In others, it is located in a UID that is docked to or otherwise in electronic communication with the cold storage unit such that it can control the storage unit's operation and receive, process, and store data and information from the storage unit's components, including its various sensors and readers. Any suitable computer, or combination of computing devices, including any necessary circuitry and other components (e.g., communication buses, memory, etc.). Thus, in the context of the invention, a "computing device," "computer," and analogous expressions refer to one or more devices including at least a tangible computing element. Examples of a tangible computing elements include a microprocessor, application specific integrated circuit, programmable gate array, and the like. Examples of a computing device include, without limitation, a mobile computing device such as a smart phone or tablet computer, a wearable computing device (e.g., Google® Glass), a laptop computer, a desktop computer, a server, a client that communicates with a server, a smart television, a game console, a part of a cloud computing system, or any other form of computing device. The computing device preferably includes or accesses storage for instructions used to perform steps to control components of a cold storage unit, for example, the access panel(s), robot(s), refrigeration unit(s), temperature sensors, light source(s) and detector(s), etc., to collect and process data from various sensors, and, in preferred embodiments, to operate in a networked environment that operates under an ASP model.

The computer of a cold storage system may be implemented as a special purpose data processor, a general-purpose computer, a computer system, or a group of networked computers or computer systems configured to perform the steps of the methods described in this document. In preferred embodiments, the computers of two or more cold storage units are interconnected by a network. Typically, a computer of a cold storage system includes a processor, read only memory (ROM), random access memory (RAM), network interface, a mass storage device, and a database that is used to store and organize data about the storage unit's operation and products stored therein. The database may be a physically separate system coupled to the processor. In alternative embodiments, the processor and the mass storage device may be configured to perform the functions of the database. The computer's components are coupled together by a bus.

The processor may be a microprocessor, and the mass storage device may be a magnetic disk drive. The mass storage device and each of the memory modules are connected to the processor to allow the processor to write data into and read data from these storage and memory devices. For networking, a network interface couples the processor to the network, for example, the Internet. The nature of the network and of the devices that may be interposed between a cold storage unit's computing system and the network determine the kind of network interface to be used. In some embodiments, for example, the network interface may be is an Ethernet interface that connects the system to a local area network, which, in turn, connects to the Internet to form a wide area network that may, in fact, include a collection of smaller networks. In some embodiments, a cold storage unit's internet connection uses a local internet router, hardwired or wireless, or a cell phone card embedded in the cold storage unit.

The processor reads and executes program code instructions stored in the ROM module, the RAM module, and/or a storage device. Under control of the program code, the processor configures the system to control the cold storage unit's operation and, in networked embodiments, to communicate with a service provider to send and receive data and information over the network to which the storage unit is connected. In addition to the ROM/RAM modules and storage device, the program code instructions may be stored in other machine-readable storage media, such as additional hard drives, flash memories, legacy media such as floppy diskettes, CD-ROMs, and DVDs, and other machine-readable storage media and/or devices. The program code can also be transmitted over a transmission medium, for example, over electrical wiring or cabling, through optical fiber, wirelessly, or by any other form of transmission. The transmission can take place over a dedicated link between telecommunication devices, or through a wide area or a local area network, such as the Internet, an intranet, an extranet, a cloud computing environment or portion thereof, or any other kind of public or private network. The program code can also be downloaded into the system through a network interface.

In preferred embodiments, the computer is implemented as a user interface device (UID), preferably a tablet computing device either docked on the cold storage unit or wirelessly connected thereto. In networked systems that comprise a plurality of cold storage systems connected via an internet network, a UID communicates with an application service provider (ASP). A UID typically includes a touch screen or keypad or keyboard and display to display and access information stored in the computer, as well as to allow a user to enter information into the computer.

In some embodiments that employ a UID as a cold storage unit's computer, a part thereof, the UID is configured to display a home screen that shows information about the cold storage unit and its contents. Such information may include, for example, the names, dosages, quantities, and/or expiration dates of temperature sensitive products stored in the cold storage unit; the current temperature and/or a temperature history of the cold storage zone(s); alerts; and/or the order status of additional temperature sensitive products ordered for storage in the cold storage unit. Displayed information may also include information about the temperature sensitive products stored in the storage unit. Such information can include, for example, the location of individual unit(s) of such temperature sensitive product by storage bay, cold storage zone, and/or temperature zone; temperature history; lot number(s); expiration date(s); and/or internet links to additional information (e.g., package inserts, dosing information, recall information, etc.) about a particular temperature sensitive product.

As described, another object of the invention concerns automated management systems for temperature sensitive products. Such systems include an automated temperature sensitive product cold storage unit according to the invention in communication with an ASP, preferably a cloud-based hosted ASP environment that provides inventory management, system administration, alerting, and/or reporting services, wherein the storage unit includes a computer, for example, a UID, to provide user access to the cold storage unit and information regarding its contents and/or operation, a data collection system wherein the cold storage unit's computer (e.g., UID) and/or the ASP capture and store data related to the cold storage unit and temperature sensitive products stored therein.

In the context of inventory management, the systems of the invention allow, for example, one or more of the real-time tracking of the inventories of temperature sensitive products stored in each cold storage unit in the system, tracking of product dispensing and stocking transactions in each cold storage unit, tracking of expiration dates of individual temperature sensitive products, automated transmission of re-order messages when temperature sensitive product inventories become depleted in a particular cold storage unit, automated transmission of expired product and/or about-to-expire messages, and/or providing product and/or regulatory information about temperature sensitive products stored or to be stored in a particular cold storage unit. Other inventory management information that may be generated by such systems includes billing information about particular temperature sensitive products dispensed from a cold storage unit within such a system.

System administration services may include, for example, monitoring cold storage unit location information, monitoring information related to the physical status of one or more cold storage units in the system, including function, power, temperature, access panel operation, and/or temperature sensor data from each storage unit, maintaining communication between a given cold storage unit's computer, UID, ASP, and cell phone card applications, maintaining secure access between cold storage units and the ASP, facilitating cold storage unit maintenance, and updating software stored in a memory of one or more cold storage units within the system.

A system according to the invention can also be configured to provide alert information, typically by providing an alerting message to one or more pre-selected recipients and/or a UID upon the occurrence of an event intended to trigger an alert. With respect to a particular cold storage unit within the system, such events may include, for example, a cold storage zone temperature excursion that exceeds a preset threshold, inventory of a particular type of temperature sensitive product stock becoming depleted or reaching a preset lower limit, a temperature sensitive product having expired or that will expire within a preset number of days, and a power disruption to the cold storage unit.

A system according to the invention can also be configured to provide various types of reports, typically to authorized cold storage unit users, system administrators, maintenance personnel, sales representatives, billing agents, and the like. Reports can be standardized across the system, or they can be customized for particular users.

Related aspect of the invention concerns various methods of making and using the cold storage units and systems according to the invention. Among these are methods for managing a temperature sensitive product inventory. Such methods involve storing a plurality of temperature sensitive products in one or more cold storage units according to the invention, using the cold storage unit's computer (e.g., UID) to collect and store data related to the cold storage unit and the temperature sensitive products stored therein, and providing services via an ASP that uses software and servers in an Internet or cloud-based hosted environment to provide inventory management, system administration, alerting, and/or reporting services, as described above, plus such other services as are now known or may later be developed that can assist in the management of cold storage units according to the invention and temperature sensitive products. In presently preferred embodiments, such methods involve collecting data that includes some or al of the following data: descriptor data for temperature sensitive products; temperature sensitive product type and storage location in the cold storage unit; dispense and refill transaction data; reader acquired data; information entered manually or remotely by a user using a user interface on the computer, a UID, or other data entry device communicating with the computer; temperature sensor data for one or more cold storage zones; system security data; and/or cold storage unit and/or component function status.

Representative Embodiments

The following detailed description illustrates an embodiment of the invention by way of example, not by way of limitation of the principles of the invention. Various embodiments of the invention will be described by way of illustration with reference to various software tools, but it should be understood that other software tools that have comparable capabilities of the mentioned tools may be used.

Provided herein is an automated, smart cold storage units and systems for preferably secure storage of temperature sensitive products (e.g., pharmaceuticals, research reagents, etc.) at preset temperatures. Such cold storage units and systems are preferably used to identify, track, and maintain inventories of temperature products at optimal levels and potency for compliance with regulatory requirements, if and where applicable. Below the inventors describe a particularly preferred embodiment of the invention where the cold storage unit provides one access point for the rapid loading and unloading of product to and from the unit minimizing product exposure to ambient temperatures and reducing time required by unit user to locate and obtain product from the unit. A cylindrical array of storage bays functions as the storage area framework within the cold storage compartments, and is designed to hold a plurality of carriers, each carrying one product, moved from a loading zone carousel to a storage location by a gantry robot. Product upload time may range from approximately several seconds (e.g., about 5-30 seconds) per product to as rapid as approximately 1 to 2 seconds per product. The unit operating system tracks the location of each product and the temperature near the product with multiple temperature sensors in each temperature zone. The cold storage unit devices such as temperature sensors, readers, locking mechanism, and security features communicate with a user interface device (UID), docked on the unit, via a direct hard wire link or a wireless connection. The UID controls access to the unit, collects data related to the status of the cold storage and its inventory content, and communicates with an ASP provided software in a cloud based hosted environment for inventory and information management.

Cold Storage Unit

An automated smart cold storage unit in one exemplary embodiment is a smaller unit, designed for a point of care facility such as a physician's office, a clinic, or an onsite pharmacy. The unit has a load capacity of 864 products, is approximately 54 inches tall and provides 9 cubic feet of space with a footprint of about 28×28 inches. The exemplary unit contains two temperature zones that can be set to the commonly recommended temperatures for the storage of biologic pharmaceuticals. A first cold temperature zone is maintained between 2° C. and 8° C., and a second frozen temperature zone maintained between minus 15° C. and minus 50° C. The first temperature zone is maintained preferably between 3° C. and 7° C. and more preferably between 4° C. and 6° C. The second temperature zone is maintained preferably between minus 15° C. and minus 30° C., and more preferably between minus 15° C. and minus 25° C.

Each product is stored within a carrier, such as shown in FIG. 1A to FIG. 1C. A product is placed in the exemplary boat like carrier (100) for intake into the cold storage unit and remains in the boat carrier until it is removed from the unit. An exemplary boat carrier holds a single product whose dimension may reach approximately 10 cm×3 cm×2 cm. The boat carrier is adapted with a latch mechanism (101), as shown in FIG. 1A, that is hooked by a robotic arm used to pull-in and push-out the boat carrier in and out of a gantry robotic arm sleeve. The carrier has a groove (105) at one end of the carrier and an opening (106) at the opposite end, below the latch mechanism, that allow diagonal passage of a sensor beam through the carrier, shown in FIG. 1B. FIG. 1C provides a bottom perspective view of the carrier with the hole (106) below the latch and ridges (108) used to suspend the carrier within the storage array.

Figure 2B:
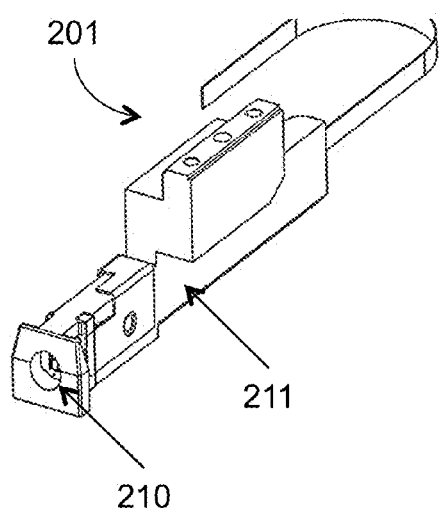
FIG. 2B provides a perspective view of a sensor and hook rod of the robotic arm of a R, Θ, Z gantry robot.
Figure 2C:
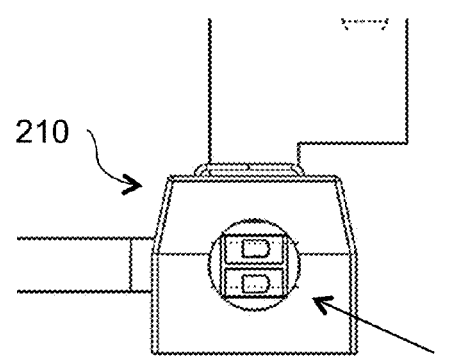
FIG. 2C provides a perspective view of the sensors within the tip of the R, Θ, Z gantry robotic arm rod.

The robotic arm (200) of a R, Θ, Z gantry robot, one of two equivalent arms positioned 180° in opposing direction, as show in FIG. 2A, transport the boat carriers between the loading zone and storage locations. A rod (201) fitted with an adaptor (202), designed to fit within and hook the boat carrier latch mechanism (101 of FIG. 1), is positioned within the rectangular sleeve casing (203) of the robotic arm. The casing further ensures the product does not fall out of the carrier during transport. The rod is designed to slide along the R axis into the latch mechanism (101) of the boat carrier, hooks the boat carrier, and pulls the carrier inside the sleeve of the robotic arm. A reflective light beam sensor at the tip (210) of the rod (201) whose motion is controlled by the slide/lift mechanism (211) within the robotic arms, as shown in FIG. 2B, passes by the latch of the boat carrier to determine its position and orient the gantry robotic arm for a proper fit between hook and latch. The sensor (220) within the tip of the rod (210) is further shown in FIG. 2C. Once the boat and product are within the gantry robot arm the arms rotate 180° horizontally and push an empty boat carrier, stored within the opposing arm, into the original product location. The product loaded within the boat carrier thus remains securely held within the robotic arm until the boat carrier is delivered to and pushed into a storage location. The robotic arm removes an empty boat carrier from the storage location prior to inserting the filled boat carrier into the storage location. The robotic arms thus exchanges a filled and empty boat carrier with each product relocation.

Figure 3:
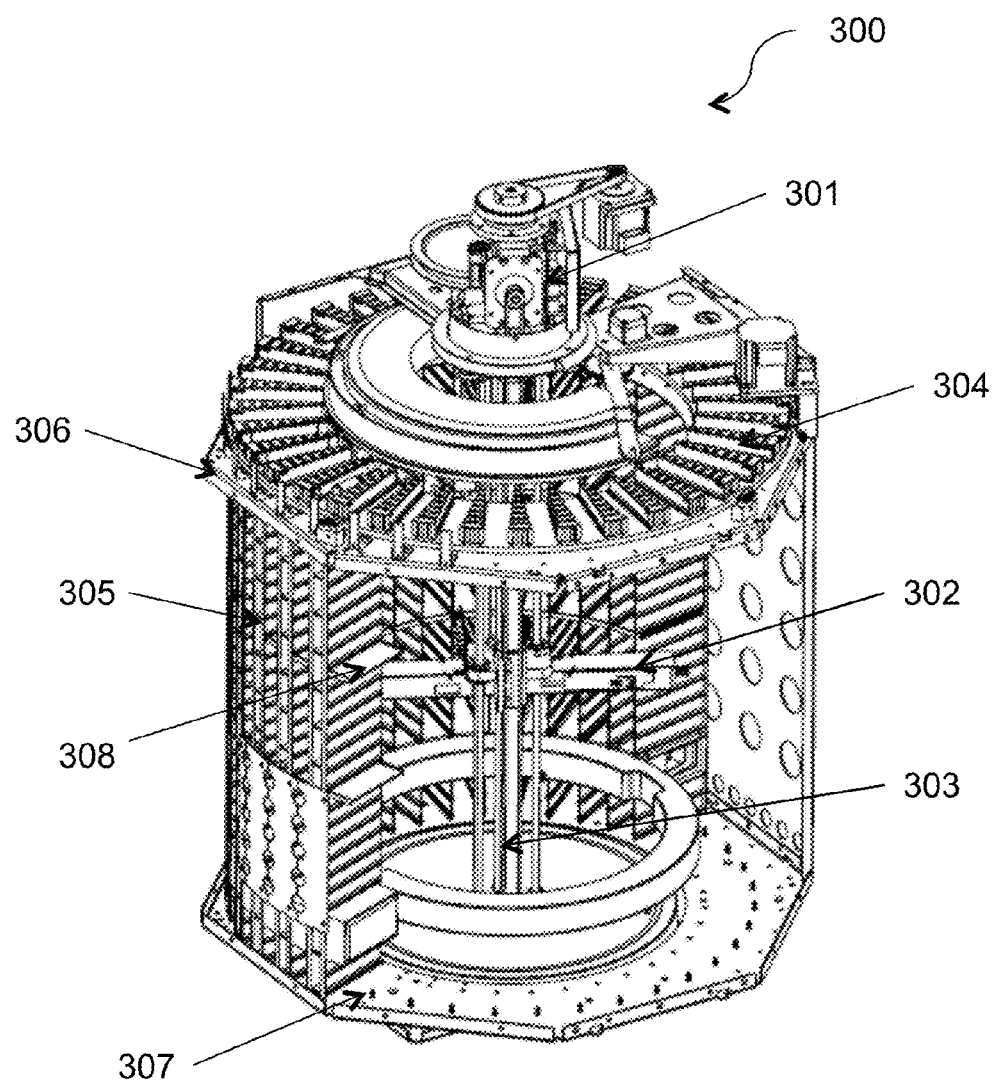
FIG. 3 provides a perspective of the internal view of the unit with loading carousel, a portion of the storage zones, and gantry robot.
Figure 4:
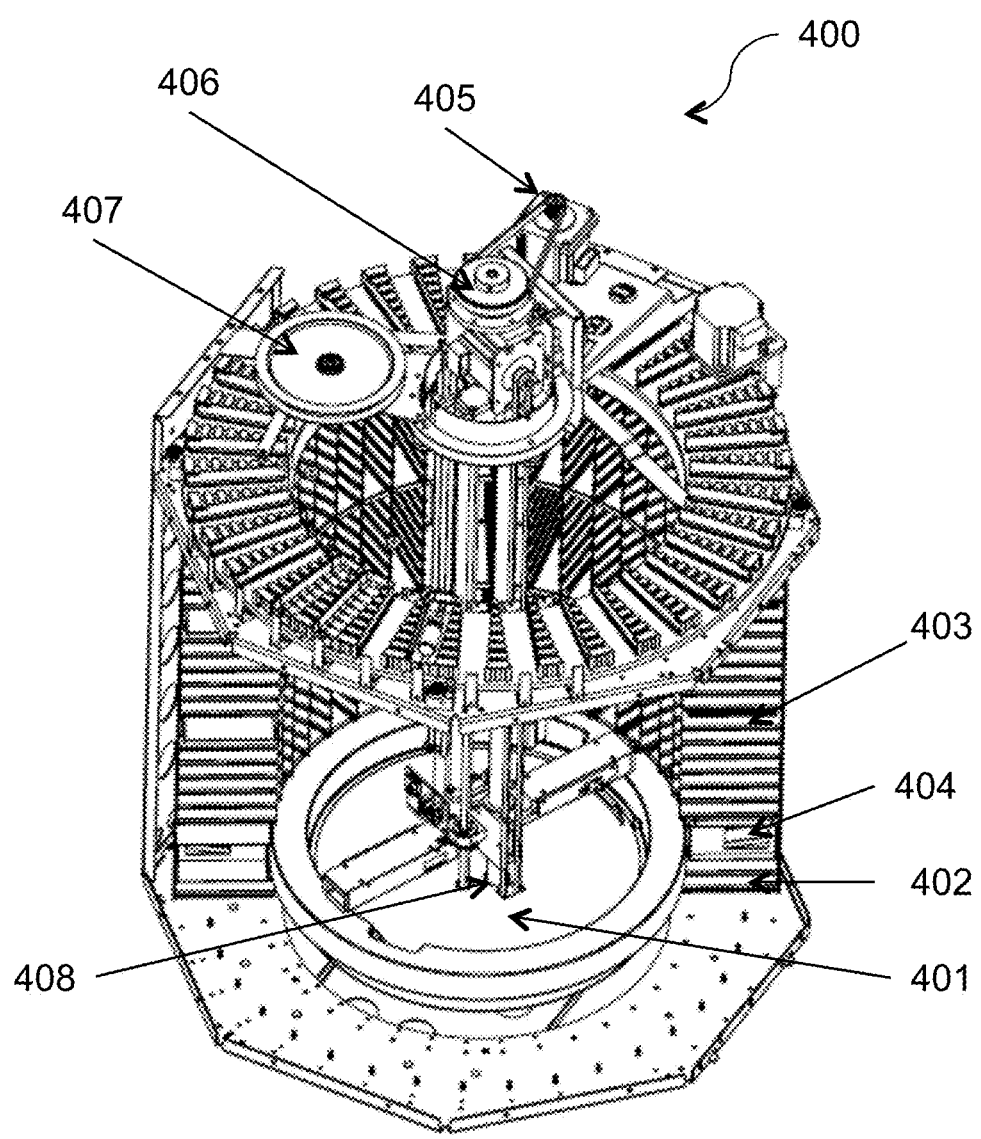
FIG. 4 provides a perspective of the internal view of the unit storage zones, loading carousel gantry robot and insulation between temperature zones.

The internal view of the unit (300) as shown in FIG. 3 provides a view of the R, Θ, Z gantry robot (301) and gantry arms (302). A seal, as shown in FIG. 4, separating the two temperature zones is omitted in this view. The gantry arms (302) move vertically along a central shaft (303) of the gantry robot and rotate 365° about the shaft to pick up or deliver a boat carrier to and from the loading carousel (304) or any of the plurality of cylindrical array of storage bays (305) within the unit.

Figure 8A:
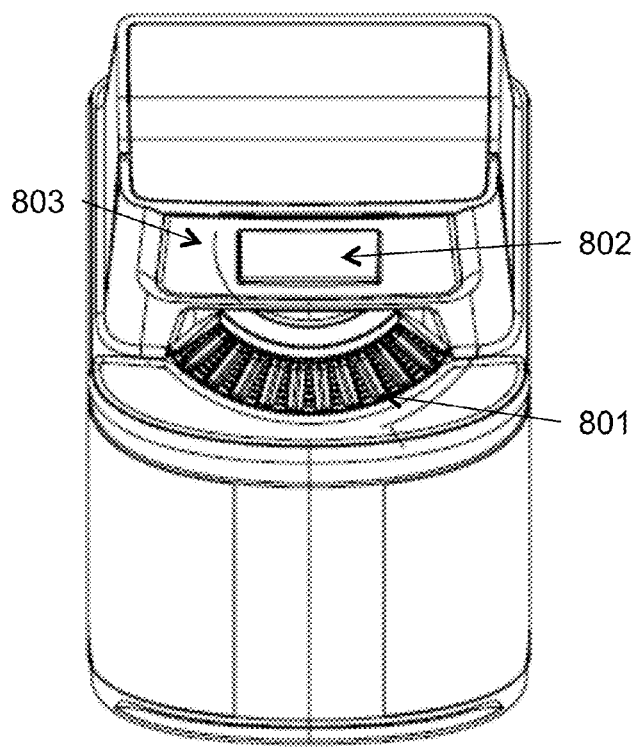
FIG. 8A provides a frontal perspective of the exterior view of the automated cold storage unit with the door to the loading portion of the carousel fully opened.

A carousel (304), on a platform (306) at the top of the array, rotates about the central shaft to position empty boat carriers for loading into the loading zone, further shown in FIG. 8A, and to position filled boat carriers inside the unit to be picked up by a gantry robotic arm and moved to a storage location. In one exemplary design the carousel holds 36 boat carriers.

The boat carrier storage location is a cylindrical array of storage bays (305) designed to hold the boat carrier in specific location within the array and allow air flow, and thus temperature, to be maintained around the carrier. The cylindrical array of storage bays is formed by an arrangement of a series of parallel vertical strip, separated by a distance designed to accommodate the width of the boat carrier, that reach from the base (306) of the rotating carousel platform to the bottom of the internal storage area (307). Each set of parallel strips contains internal ridges at intervals slightly higher than the height of the boat carrier that support the boat carrier between the strips without the need of a solid base. A solid base (308) is provided between every 4-10, preferably 7, ridges to maintain a rigid structure of the vertical strips. The cylindrical array of storage bays contains preferably 36 pairs of parallel strips and is designed to hold 24 floors of boat carriers. The cylindrical array of 36 pairs of parallel strips and 24 floors can hold 864 boat carriers. The location of each boat carrier, and thus each product, is defined by the floor and storage bay position number on that floor. The array is filled with carriers, empty or filled with product, that are pushed and pulled in and out of the holding storage bay by the gantry robotic arms.

The internal view of the unit (400) provided in FIG. 4, provides a view of the seal (401) that separates the two temperature zones of the unit. The bottom two floors (402) of this exemplary cylindrical array of storage bays are dedicated to the sub zero degrees temperature zone, the freezer compartment, and the top 22 floors (403) are dedicated to the above zero degrees temperature zone. An insulation layer (404) within the array of storage bays forms a thermal seal between the two temperature zones. The insulation layer in one embodiment is inserted between the array strips that reach from the underside of the carousel platform to the base of the freezer compartment. In yet another embodiment an array insulation ring is placed between the refrigerated and freezer compartment creating a break in the array strips while maintaining a vertical continuum of storage carrier locations.

The motor and pulleys used to control the movement of the gantry robot, shown in FIG. 4, are a theta axis motor (405), a theta axis pulley (406), a cable uptake pulley (407) and a Z axis guide rail (408)

Figure 5:
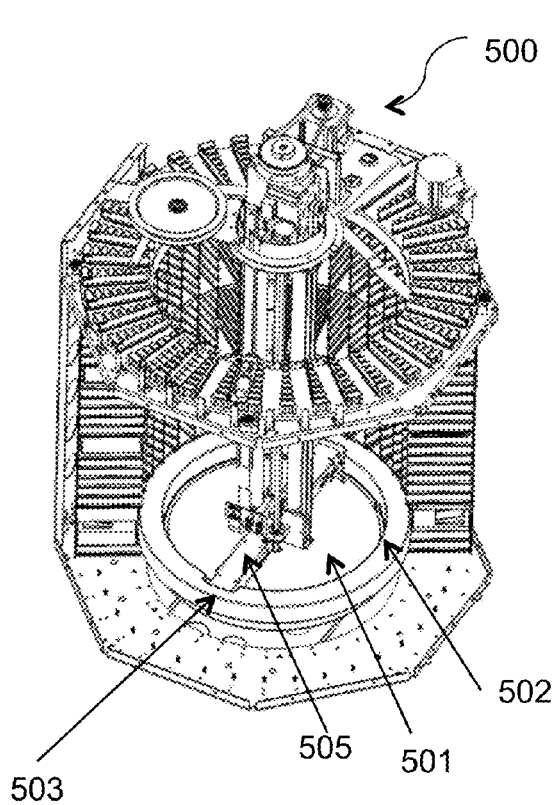
FIG. 5A and FIG. 5B provide a perspective of the internal view of the unit storage zones and the gantry robotic arm positioned in the key way seal (FIG. 5A) for entry into the freezer compartment and positioned within the freezer compartment ((FIG. 5B).
FIG. 5C provides a perspective of the ring structure holding the keyway seal separating the temperature zones.
FIG. 5D provides a perspective of the internal view of the unit storage zones and the key way seal pushed down by the gantry robotic arms to the bottom of the freezer compartment.
Figure 5:
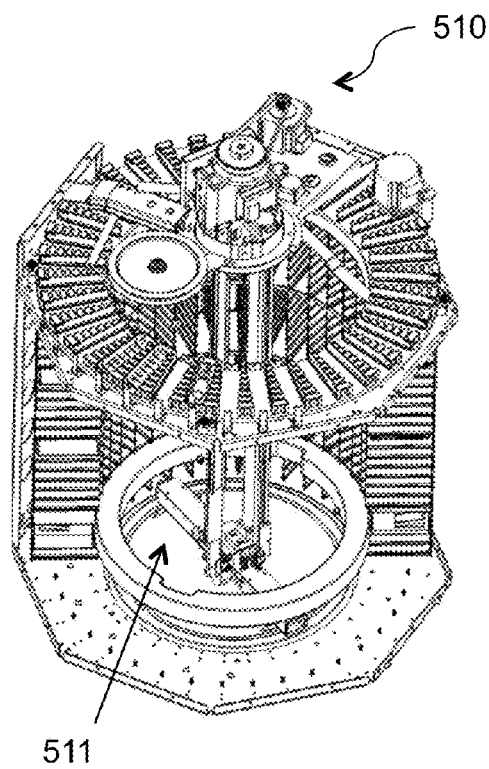
Figure 5:
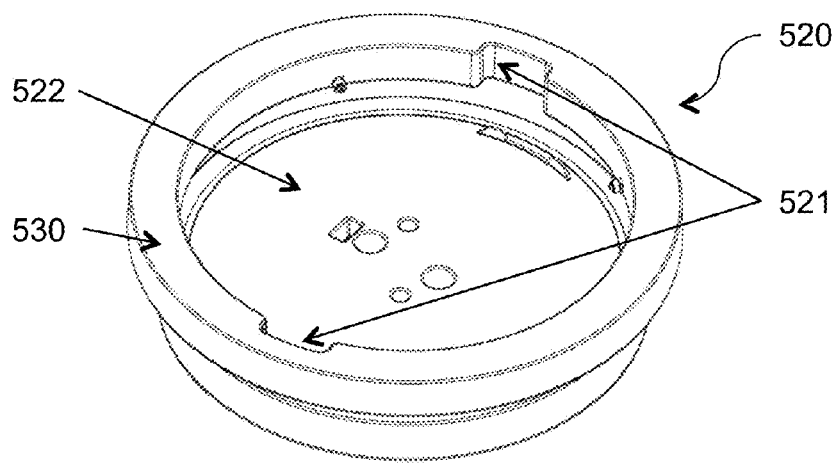
Figure 5D:
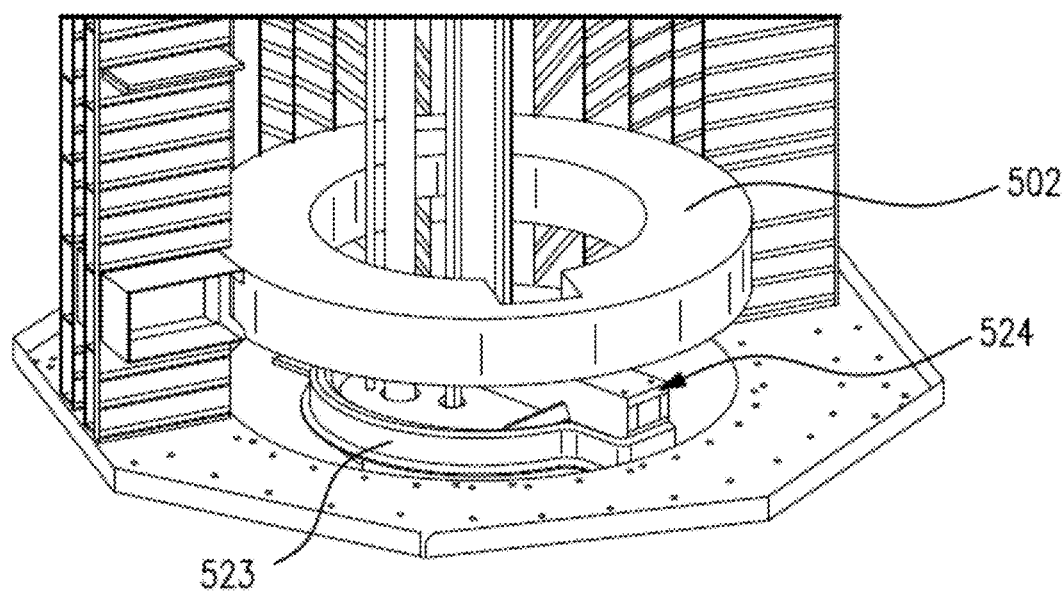

The movement of the gantry robotic arms between the temperature zones is shown in FIG. 5A and FIG. 5B with an enlarged view of the keyway insulation ring, keyway seal and plug shown in FIG. 5C and FIG. 5D. The gantry robotic arms deliver and remove boat carriers to and from the freezer compartment by passing through a keyway insulation ring (502), pressing down a disk (501), "keyway plug", into the freezer compartment. The keyway insulating ring (502) fused with the insulation layer of the holding bay array, keyway plug (501), and keyway seal (523) provide a thermal seal between the two temperature zones. The keyway plug (501) is free to rotate with the gantry robot. The keyway plug is pushed down by the proper orientation of the gantry robotic arms, positioned to move vertically, along the Z axis, through the inset groove (503) within the keyway insulation ring and into the freezer compartment. The keyway plug and seal pushed down (511), as shown in FIG. 5B, into the freezer zone by the gantry arms allows access of the robotic arm to the bottom two floors of the freezer storage compartment is shown in FIG. 5B.

The keyway insulation ring (530) enlarged view (520), as shown in FIG. 5C, contains grooved slots (521) that allow the movement of the gantry robotic arm into the freezer section by pushing the keyway plug (522) and keyway seal down and into the base of the freezer compartment. The keyway seal (523) pushed down, below the keyway insulation ring (502), with the keyway plug into the bottom of the freezer compartment by the gantry robot arms (524) is shown in FIG. 5D.

The keyway ring, in one embodiment, may extend into the storage bay array forming a thermal and physical separation between storage bay array portions between two temperature zones or in yet another embodiment may be fused with the insulation layer within a storage bay array or between two storage bay arrays between two temperature zones. The keyway ring may be fused to the insulation layer using methods known to bind polymeric materials, commonly used by those skilled in the art, such as gluing or heat fixing, The keyway insulation ring in yet another embodiment may be mechanically attached to the insulation layer using, for example, fasteners (e.g., screws), hook and loop elements, etc. to fasten the two portions.

Figure 6:
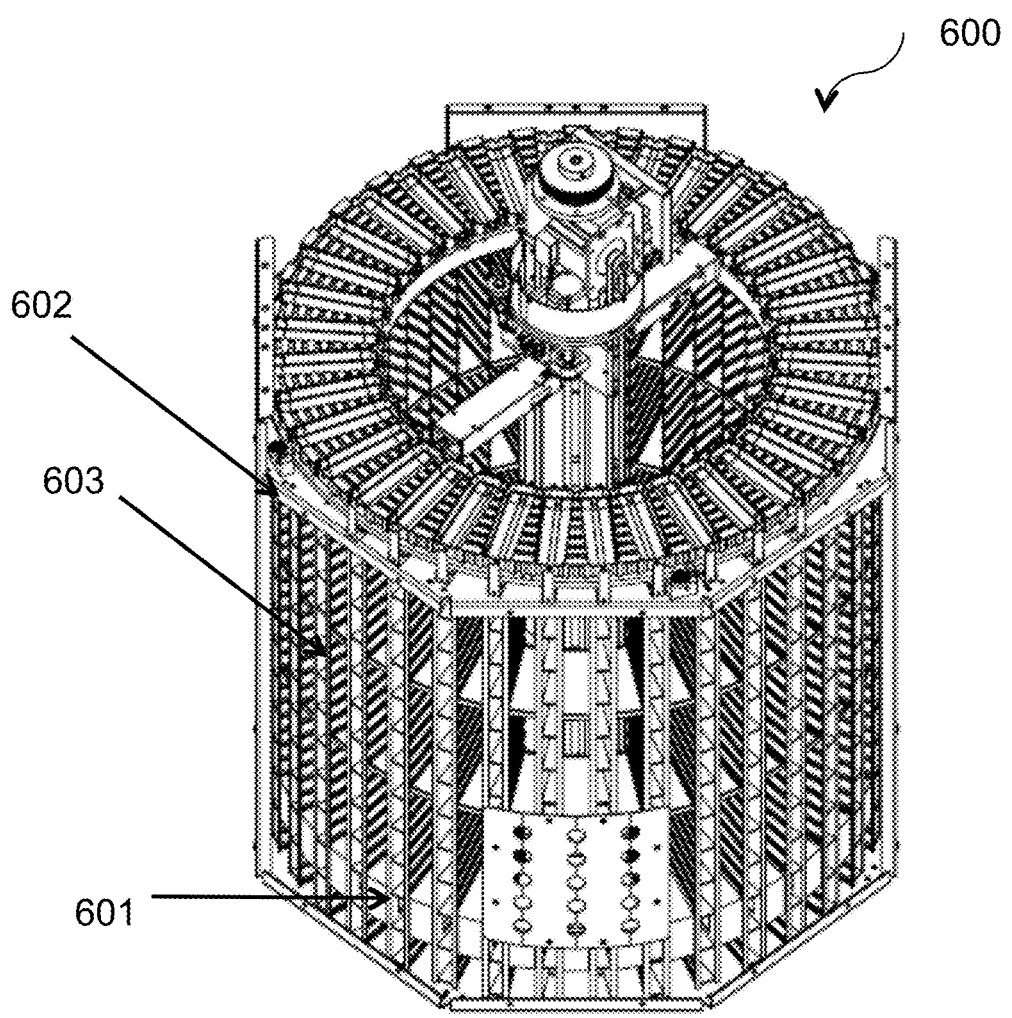
FIG. 6 provides a perspective of the frontal internal view of the unit storage zones, loading carousel, and separation of the two temperature zones.

The frontal internal view (600) of the unit storage zones and loading carousel is shown in FIG. 6. An insulation layer (601) is located between the freezer and cold storage zones and provides a thermal barrier between the two zones. The carousel platform (602) is located above the cylindrical array of storage bays (603) shown in full.

Figure 7A:
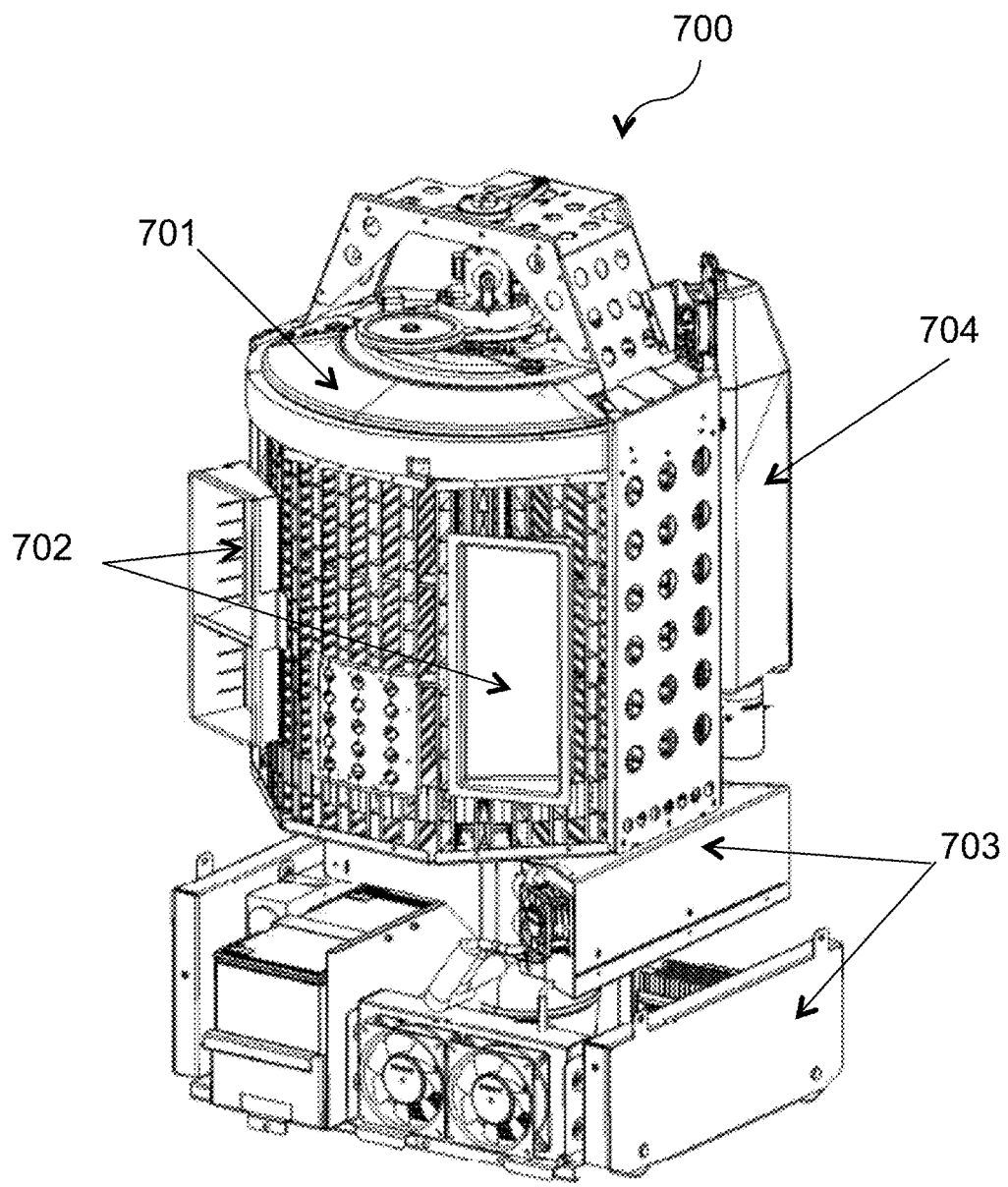
FIG. 7A provides a frontal perspective of the internal view of the unit storage zones, loading carousel door, extra refrigerated compartments, refrigeration components, and base.

The frontal perspective (700) of the internal view of the unit storage zones, loading carousel door, outer refrigerated compartments and base are shown in FIG. 7A. The doors (701) that provide access to the product loading/unloading zone of the carousel, are shown in the closed position atop the top front portion of the unit. The two doors slide open, away from the central line providing access to from 2 to 10 boats at a time. The number of boats carriers provided in the opening and available for loading or unloading is dependent upon the number of items being added to, or removed from, the unit in order to minimize cool air/warm air interchange. The loading/unloading zone and access doors are positioned at the top of the refrigerated compartment in order to minimize cold air/warm air interchange. Additional storage compartments (702) are provided for the storage of refrigerated, but non-monitored items. The compartments are isolated from, and do not exchange air with, the internal storage array.

The base (703) of the unit includes refrigeration equipment: forced air cooling over evaporator, condenser, freezer circulation fans and a compressor which may all run on battery power, also provided in the base, during holdover period. The base (703), in one exemplary embodiment, includes two 12 volt batteries.

Figures 7B, 7C:
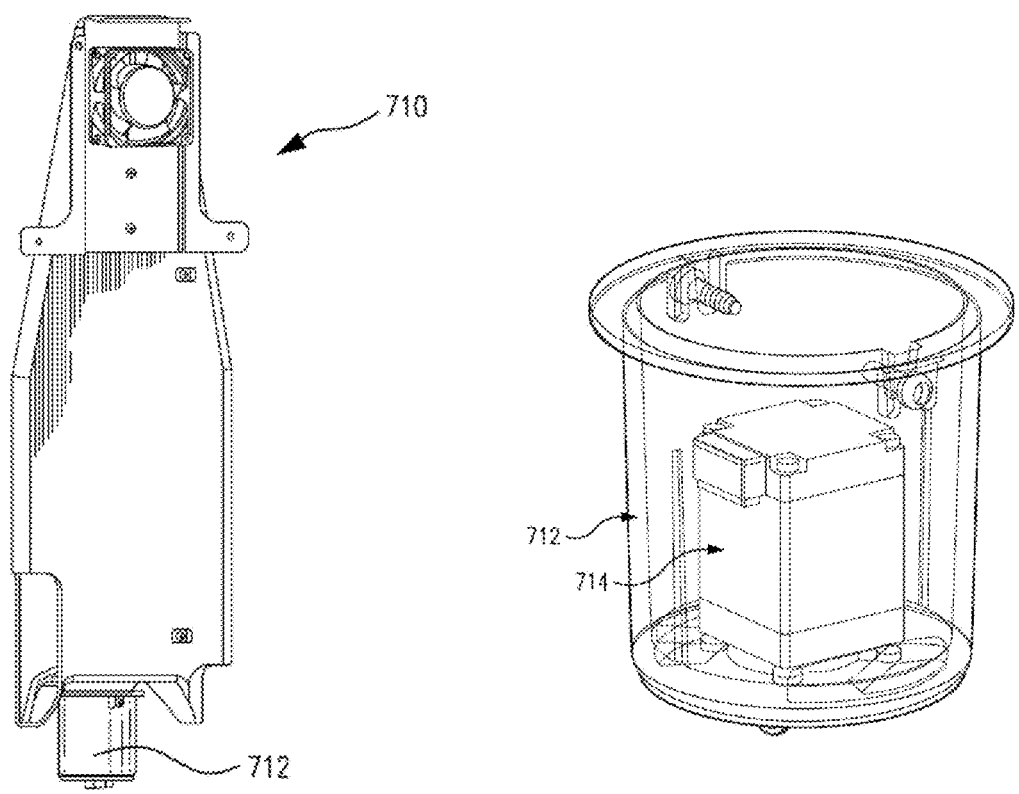
FIG. 7B provides a view of the cold air duct and cold air intake chamber.
FIG. 7C provides a view of the stepper motor within the cold air intake chamber.

The refrigerated boat loading and storage zone is cooled by delivery of cold air via air duct (704) to the upper portion of that zone. The cold air is a mixture of warmer refrigerated air and freezer compartment air. The air from the freezer compartment enters the duct (710) via a chamber (712) as shown in FIG. 7B. The below 0° C. air from freezer compartment passes into the chamber (712) compartment via a slide valve controlled by a motor (714). The motor (714), as shown in FIG. 7C, is placed within the chamber just above the valve in order to maintain the temperature at the valve just above 0° C. using the heat of the motor to prevent the valve from freezing up. By making the chamber more thermally conductive, for example placing carbon fiber within, and placing the motor directly on it, the heat of the motor is transferred more effectively. The motor is a stepper motor and can be operated, in a holding mode without any motion, adjusting current flow that generates sufficient heat to prevent valve freeze up. A second air duct, on the opposite back portion of the unit, is not visible in the perspective of FIG. 7A. The second air duct, without the chamber and motor, provides mixing and circulation of cold air within the refrigerated compartment.

Figure 7D:
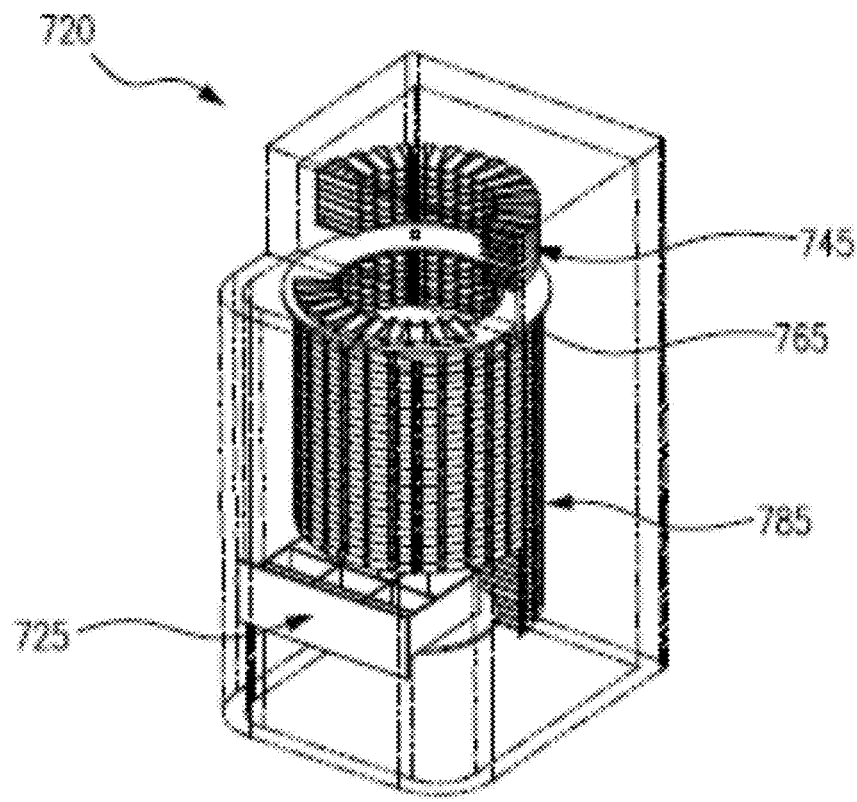
FIG. 7D provides a frontal perspective view of yet another embodiment of the arrangement of the temperature zones and extra storage compartments.
Figure 7E:
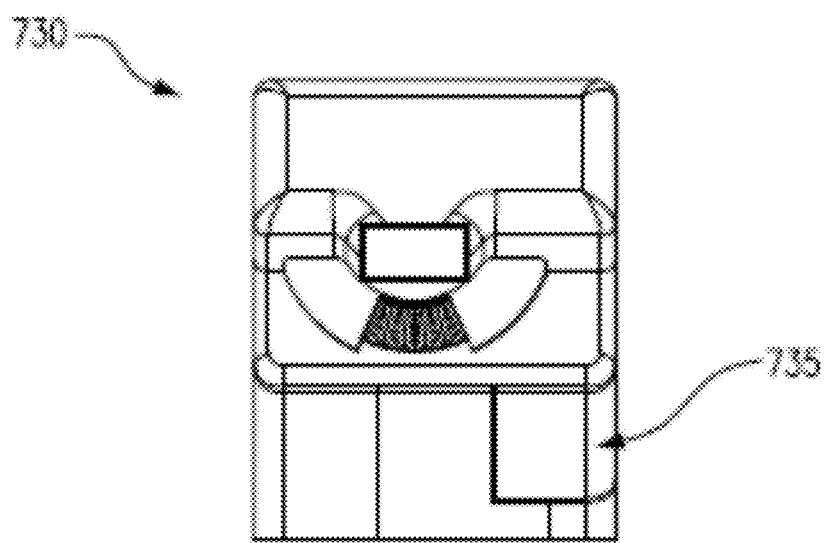
FIG. 7E provides a top perspective view of further embodiment of the location of the extra storage compartments.

In yet another embodiment of the invention the location of the refrigerated zone, freezer zone, extra storage compartments, and carousel may take on other geometries as shown in FIG. 7D and FIG. 7E. FIG. 7D provides a cold storage unit perspective where the freezer compartment (745) is located above the loading carousel (765) and refrigerated compartment (785) with extra storage compartment in the form of a drawer (725) located at the bottom of the storage array. In further embodiments the extra cold storage compartment (735) can be located on the corner of the unit just below the loading carousel, as shown in FIG. 7E.

Figure 8B:
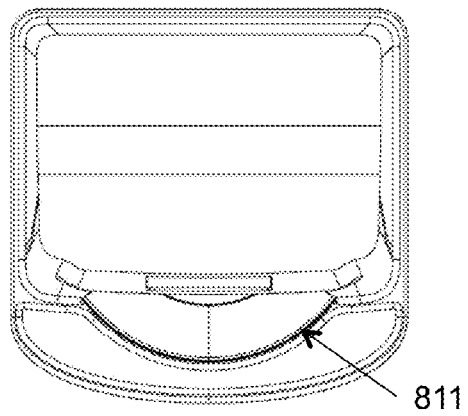
FIG. 8B provides a top perspective of the exterior view of the automated cold storage unit with the door to loading portion of the carousel closed.
Figure 8C:
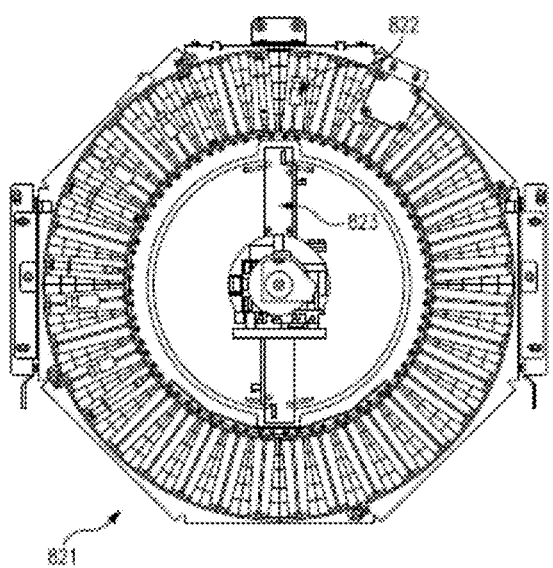
FIG. 8C provides a perspective view of the gantry robotic arms and carousel partially filled with product.

The frontal and top perspectives of the exterior view of the automated cold storage freezer unit are provided in FIG. 8A and FIG. 8B respectively. The uploading and removal of product to and from the automated cold storage unit is conducted via the automated door access to the loading zone of the carousel shown in FIG. 8A (801) and FIG. 8B (811). The opened door provides access to from two to ten boat carriers at a time depending upon the number of items being added or removed from the unit. FIG. 8A shows the door to the carousel fully opened (801) providing access to 10 boat carriers. FIG. 8B provides a view of the closed door (811) to the carousel. The perspective internal view of the carousel (821), partially filled with product (822), is provided in FIG. 8C. The gantry robot arms (823) are positioned within the carousel to load and unload product.

Figure 9A:
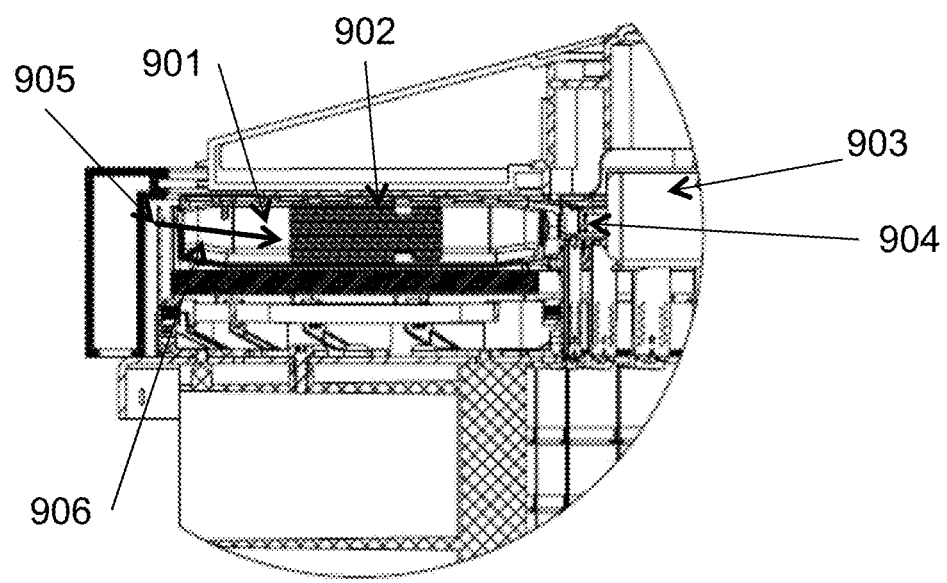
FIG. 9A and FIG. 9B provide a sliced view of a boat carrier in the loading carousel with and without a product respectively.
Figure 9B:
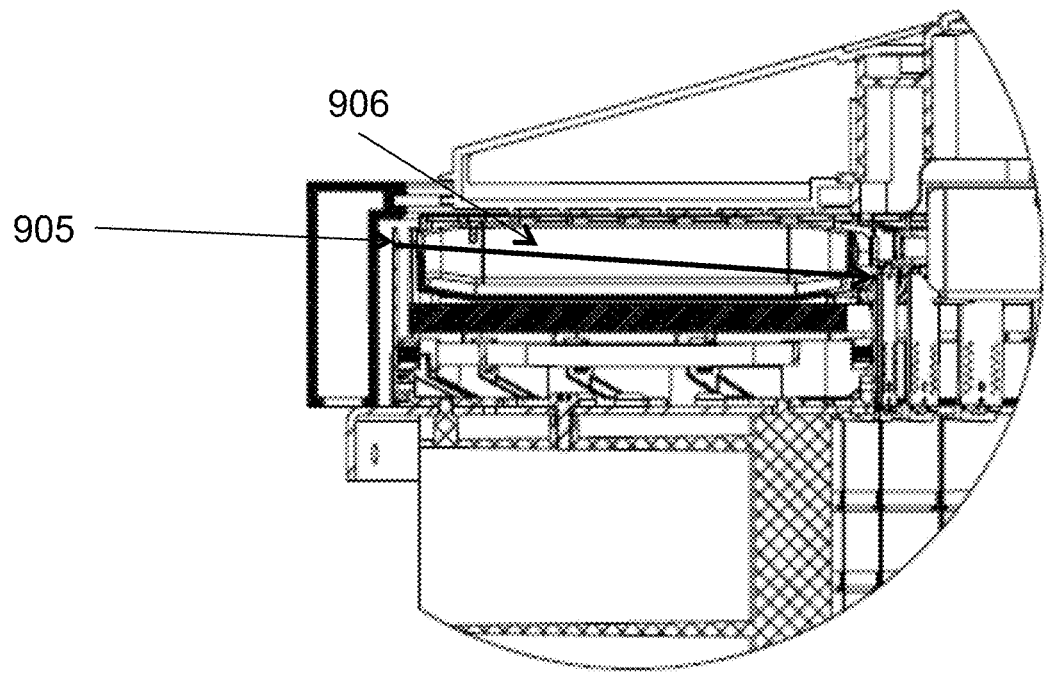

A user interface device, "UID", (802) in the form of a tablet is located in the front of the unit above the access door to the loading zone. Adjacent to the UID (802) on the internal portion of the unit is a barcode reader (803), where product is scanned prior to placement in the carrier A cross sectional view of a boat carrier (901) in a carousel with a product (902) loaded within the boat is shown in FIG. 9A. A view without a product in the boat is shown in FIG. 9B. The gantry robot arm (903) with rod (904) is positioned in line with the boat carrier. The presence of an object within a boat carrier is detected using a light beam generator (905), positioned outside the outer perimeter of the carousel and a sensor, located outside the inner portion of the carousel.

The light beam generator (905) sends a light beam (906), preferably an IR beam, diagonally through a groove in the upper portion of the boat carrier and through an opening in the opposite bottom end portion of the boat carrier, to a detector on the opposite side of boat carrier. The groove, (105) and bottom opening (106) of the boat carrier (100) are shown in FIG. 1B. The diagonal beam path allows for the detection of products varying in size and shape. When the light beam generated does not reach the detector, hence is blocked, a product is present in the carrier. The detection system, comprising a light beam generator and a sensor pair, is present in each of the loading zone positions.

The movements of the gantry robot, transporting products in boat carriers from loading zone to storage compartment and back again for unloading, are controlled by the UID and motor driver boards within the unit, and are optimized for speed and efficiency. The number of products to be added to the unit determine the loading protocol used. If one product is being added the unit the door of the loading zone will open partially to provide two empty boat in the carousel for loading. The wider opening of the doors for two boats, in the case of only one product, provides the unit user easier access to the boat carrier. For the uploading of two to ten products the door opens to provide the exact number of boats to be used. Once the product is placed in the boat, detected by IR sensor, the doors close, the carousel rotates to move the loaded boats inside the unit, and the gantry robot arm pulls the boat and product within its sleeve. The arm rotates 180° to push an empty boat into the location from which the loaded boat was removed prior to transporting product to a storage location assigned by the UID. The location will be nearest to the top of the unit, if product is stored within the refrigerated compartment, to minimize the distance the product is to be transported. The top two levels of the unit are preferably used as temporary storage in order to allow for a rapid upload of a large number of products, for example greater than about 20. If the product is to be stored within the freezer compartment the gantry robot transports the boat/product directly to the freezer. The gantry arms align with the grooves within the insulation ring, separating the refrigerated and freezer zone, allowing the gantry arms to push down the keyway plug and keyway seal into the freezer compartment and to unload the boat/product into an assigned location within the freezer compartment.

A refrigerated compartment loading protocol for a large number of products, for example 40 products, begins with ten empty boats containers provided within the loading zone, the door fully opened. Once products are placed in the boat containers, and products detected by the IR reflective sensor, the carousel rotates to present ten new empty boats for loading bringing the ten filled boats within the unit. The filled boats are immediately transported by the gantry robot from the carousel to the assigned temporary location in the top two levels of the storage array and the process is repeated until all 40 products are placed within the top two level of the refrigerated compartment. Once all products are in the unit a permanent location, filling empty storage bay positions below the top two levels of the cylindrical array, is assigned for each product and the product/boat relocated to permanent storage. With large fluctuations in inventory the unit will periodically reassign storage locations for all products held within, to the top levels below the temporary storage top two levels, space allowing, reducing time of transport required to dispense product.

Products to be stored within the freezer compartment are transported by the gantry robot to the freezer zone one at a time directly from the loading carousel.

Figure 11:
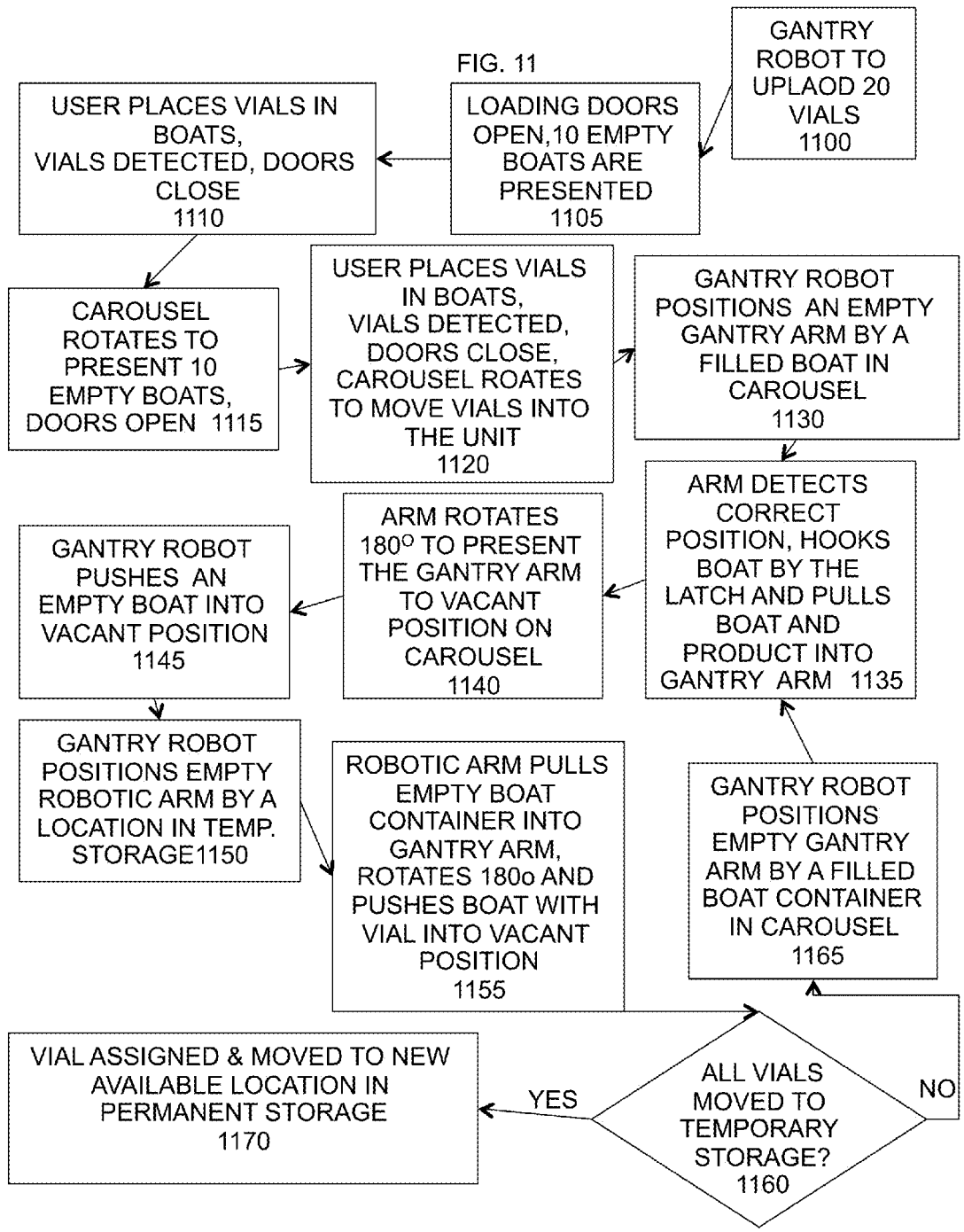
FIG. 11 is a flow diagram overview of product intake by the gantry robot.

FIG. 11 contains a flow diagram overview of an exemplary gantry robot protocol for loading product into the storage compartment. Twenty vials of product are to be loaded into the refrigerated compartment (step 1100). The loading doors open providing access to 10 empty boats in the loading zone of the carousel (step 1105). User places vials in boats, the vials are detected by the sensors associated with each of 10 positions within the loading zone, and the doors close (step 1110). The carousel rotates to provide 10 empty boats into the loading zone (step 1115) and thus rotating filled boats into the refrigerated zone. The user places vials in the empty boat carriers, the vials are detected, the doors close, and the carousel rotates to move product within the unit (step 1120). The gantry robot positions an empty, without product, gantry arm by a filled boat in the carousel (step 1130). The arm's reflective detector detects the latch on the boat and aligns gantry arm to hooks boat by the latch and pulls boat with product into gantry arm (step 1135). Arm rotates 180° to position the opposing arm by the vacant position on the carousel (step 1140) and the gantry robot pushes an empty boat into the vacant position step (1145). The gantry robot positions the empty robotic arm by an available location in the temporary storage zone of the unit, upper two levels (step 1150). The gantry arm pulls an empty boat carrier, from the temporary storage position into the gantry arm, rotates 180° and pushes boat with vial into vacant position (step 1155). Vial descriptor is assigned to the new location in temporary storage. If more vials remain in the carousel (step 1160), the gantry robot positions empty gantry arm by a filled boat carrier in carousel and repeats steps 1135-1165. Once all boats filled with the vials are moved into the temporary storage area the boat and vial are moved by the gantry robot into an available permanent storage location (step 1170). The vials are assigned new available locations in permanent storage closest to the top of the unit to optimize, minimize, product time in transport. The detection of latch, in step 1135, may be omitted if gantry robot is calibrated using numerous control carrier locations in the unit. If gantry robot arm and latch do not connect the latch detection protocol will be initiated.

The smaller unit described above, may further be implemented by dedicating the unit to only one temperature zone for example above 0° C. storage or below 0° C. storage, to meet the needs of a point of care facility. In yet another embodiment the unit may be smaller, designed to maintain a lower product inventory. Larger units in yet another implementation of the invention may be a preferred size for point of care facilities including for example a hospital, a clinic, a pharmacy or a research facility. The larger unit may also be dedicated to above 0° C. storage, below 0° C. storage, or a combination of multiple temperature zones.

The temperature within the unit is monitored at a customizable frequency that meets regulatory requirements and may vary throughout the day based on how frequently the unit is accessed. For example the temperature may be monitored at least once every 10 minutes during regular office hours and at least every 30 minutes outside of regular business hours. The sensors are connected to a back-up power source, a battery, or optionally, if the sensors are wireless sensors, they are powered by a battery.

The temperature within each temperature zone is pre-set to a temperature within the recommended storage temperature range for the products stored within and is maintained within several degrees of that point. In the event of a power failure the temperature sensors have a back-up power source, a battery, and will continue to record and store temperature data. Temperatures of the cold storage and or freezer are displayed on the UID on the external portion of the cold storage unit. The temperatures may also be displayed using a secondary device, for example a digital or LED display, embedded or mounted on the external portion of the unit. In the event of a power outage a backup battery source is available and may be used to maintain the unit for approximately 12 hours. In the event of temperature deviations outside of the recommended range a manual override may be used to unload product from the unit.

The unit is fully compliant with the World Health Organization (WHO) qualification requirements for cold storage of Time and Temperature Sensitive Pharmaceutical Products (TTSPP) (see, "WHO Expert Committee on Specifications for Pharmaceutical Preparations", WHO technical Report Series 961, 2011 available at www.who.int/). The unit is designed for storage of TTSPP, is capable of maintaining the temperature range over the full range of annual ambient temperatures at a point of care facility, is equipped with alarms to indicate temperature excursions and/or refrigeration failure and is fitted with lockable doors and an access control system. The exterior and interior of the unit is made of materials that are cleanable with sterilization solutions. The unit has a consistent temperature profile throughout the storage compartments when empty and in a normal filled capacity and is equipped with calibrated temperature sensors, accurate to ±0.5° C., capable of continuous recording. The sensors are located at points within the unit that most accurately represents the temperature profile of the TTSPP. The WHO specifications for a cold storage unit address the physical requirements, noted above, as well as protocols and methods that validate the potency of the administered TTSPP. The WHO protocol specifications include keeping records of the temperature profile of each TTSPP stored, providing alerts when deviations occur and scheduling and completing regular maintenance of the unit. The smart cold storage system provided software follows, performs and/or schedules the specified protocols.

User Interface Device (UID)

A UID (203), preferably a tablet computer with a touchpad incorporated into the display, is docked in a docking station embedded or connected to the front of the cold storage unit. See FIG. 8A. Communications between the UID and cold storage unit components is maintained preferably via a hard wire connection. The unit components include the gantry robot and motor driver boards, sensors, refrigeration components, and reader(s), The UID is the primary security interface providing a secure access to the unit and may use login code verification and/or a biometric image capture such as finger print identification, a retinal scan, a facial recognition, or a voice identification. A log in code may be a simple alphanumeric password that the user is either given or is provided an opportunity to enter a password that will be stored in the authentication server, located in the ASP database in conjunction with the user account name. The user may also be prompted to enter a security question in the event the user forgets the password and needs to be issued a new password. The security feature may be optionally disabled The UID communicates with a cloud-based ASP via an internet connection through a local internet router, a wired or wireless network adapter card, or via a cellular network using a cell phone card, embedded in the unit. When the cell phone card is activated it updates information to the ASP at customizable number of minute intervals that may vary for periods during business hours, a period of frequent use of the unit, and periods outside of business hours when the unit remains closed.

A docking station connected to or embedded on the external portion of the unit provides a port for the UID and in one exemplary embodiment functions as a link to the units components, wired internet connection, and a power source for the UID. Some of the components such as temperature sensors and readers may communicate with or deliver data to the UID wirelessly. An RFID reader, a biometric sensor, a barcode or magnetic strip reader are other exemplary devices that can communicate with the UID wirelessly or be integrated with the UID via the docking station.

Figure 10:
FIG. 10 shows an exemplary view of a UID display.

The UID uses a touch screen to display, enter and access information on the unit and its content and to provide the unit user with access to the unit content. An exemplary default UID display includes: current temperatures, current product content with name and quantity of pharmaceuticals, nearest expiration date, alerts, and order status. By selecting the name of a specific pharmaceutical product on the UID screen further information about the pharmaceutical product is displayed including location by compartment, temperature history, lot numbers with associated expiration dates of current inventory; and links to manufacturer and/or Centers for Disease Control and Prevention (CDC) information on the pharmaceutical. FIG. 10 shows an exemplary display on the UID.

Reader

A reader in one embodiment is a device used to identify and/or count products present in the unit or being added to or removed from the unit. The reader device is embedded in, attached to, and/or unattached, to the unit and is in communication with the UID via a wired or wireless connection. Suitable reader devices are known to those skilled in the art and may be selected from various technologies including a camera, a radio frequency identification (RFID), barcode scanner, and or magnetic strip reader. Preferably a barcode reader is selected as most products, including pharmaceutical products, packaged individually or in groups by lot number, are labeled with a barcode by the manufacturer.

An exemplary reader is a camera that captures the image of a product, including a barcode label, and via the internet, wired or wireless, sends the image to the UID for analysis. An UID provided software analyzes the image obtaining product descriptor information that includes product name, dosage, lot number, and expiration date. The camera may be located on the UID and/or within or above the cold storage compartment. A camera reader is a technology readily available, simple to use, and does not require special labeling of the product In yet another embodiment of the invention a barcode reader is used to identify a product. The barcode reader in this case contains decoder circuitry analyzing the barcode's image sending the information directly to the UID wherein the UID stores and also send the product information to the ASP to be added to a product database. The on-site user may scan the product being added to the unit with a handheld or an embedded reader wherein the information is transmitting to the UID via a wireless or a wired connection.

The smart cold storage unit may also be implemented with RFID technology by placement of an RFID reader, a two way radio transmitter-receiver wired to a transmitter, in communications with the UID which transfers the signal to the ASP provided RFID software to generate a product descriptor. The product in this case must be labeled with an RFID tag.

A reader in yet another embodiment is a biometric or magnetic strip device used as a security measure to identify an authorized user of the unit.

In embodiments using biometric authentication, some biometric information, such as a fingerprint image, is obtained and stored in the authentication server for use as the authentication credential. Such biometric information may be, but are not limited to, finger print images, spoken phrases for use in voice recognition, and facial images for use in facial recognition. In embodiments using finger print biometric information, users will have a fingerprint scanned to generate a fingerprint template that is stored in the authentication server. For other forms of biometric authentication, users may record a voice sample or have their retina scanned, with the resulting recording (or voice print) or image stored in the authentication server. For embodiments using facial recognition as a form of authentication, a camera may be employed to take detailed photographs of a user's face.

Figure 12:
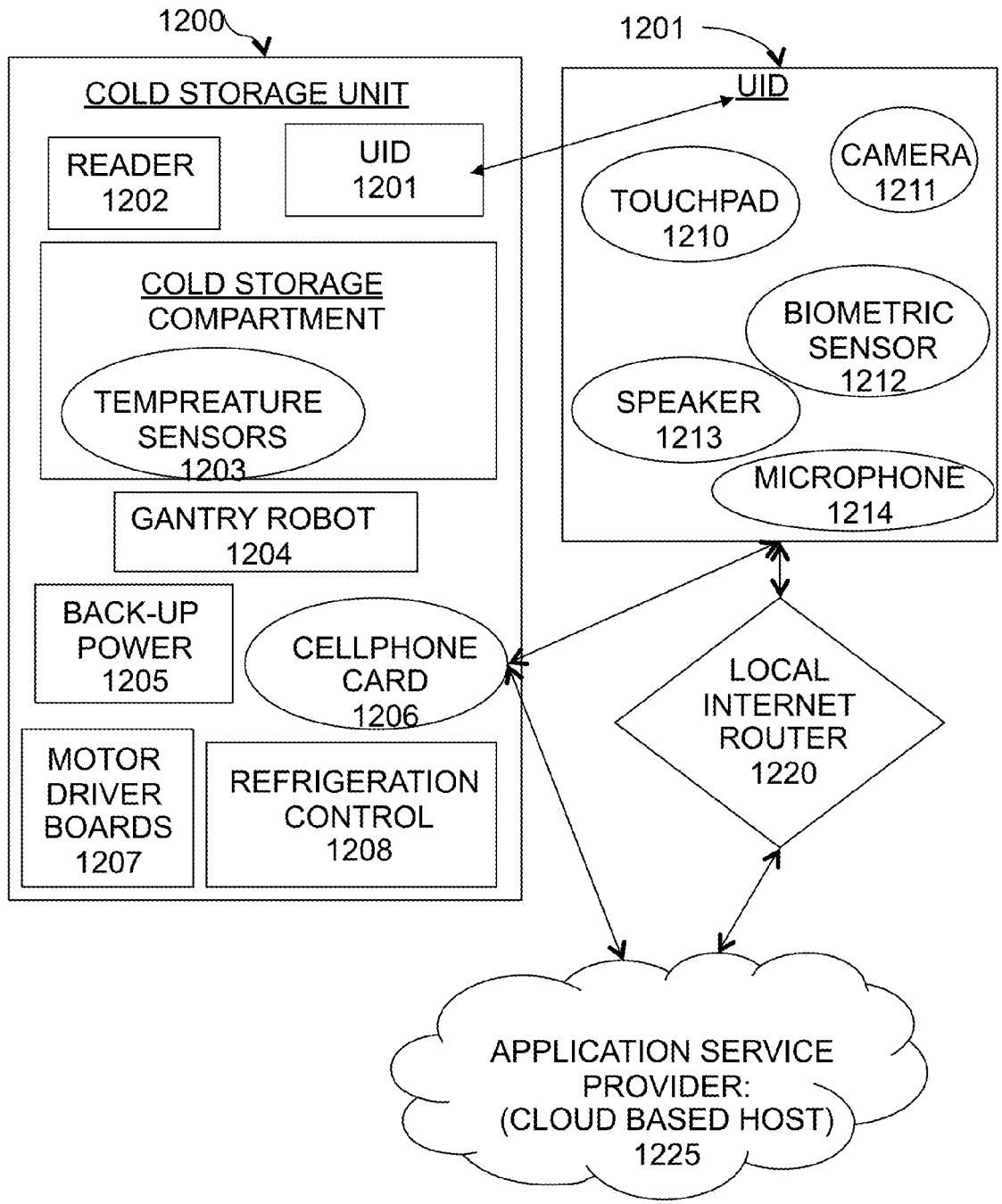
FIG. 12 is a block diagram overview of cold storage system components.

FIG. 12 contains a block diagram overview of an exemplary cold storage system and product management components. The unit (1200) includes a UID (1201), an internal reader (1202), temperature sensors (1203) connected to a backup power source 1205, a cell phone card (1206), motor driver boards (1207), refrigeration control system (1208), and a gantry robot (1204). A UID (1201) includes a touch pad (1210), a camera (1211), a biometric sensor (1212), a speaker (1213), and a microphone (1214). The UID is connected to a local internet router (1220) which provides access to a cloud based Application Service Provider (ASP) (1225).

Figure 13:
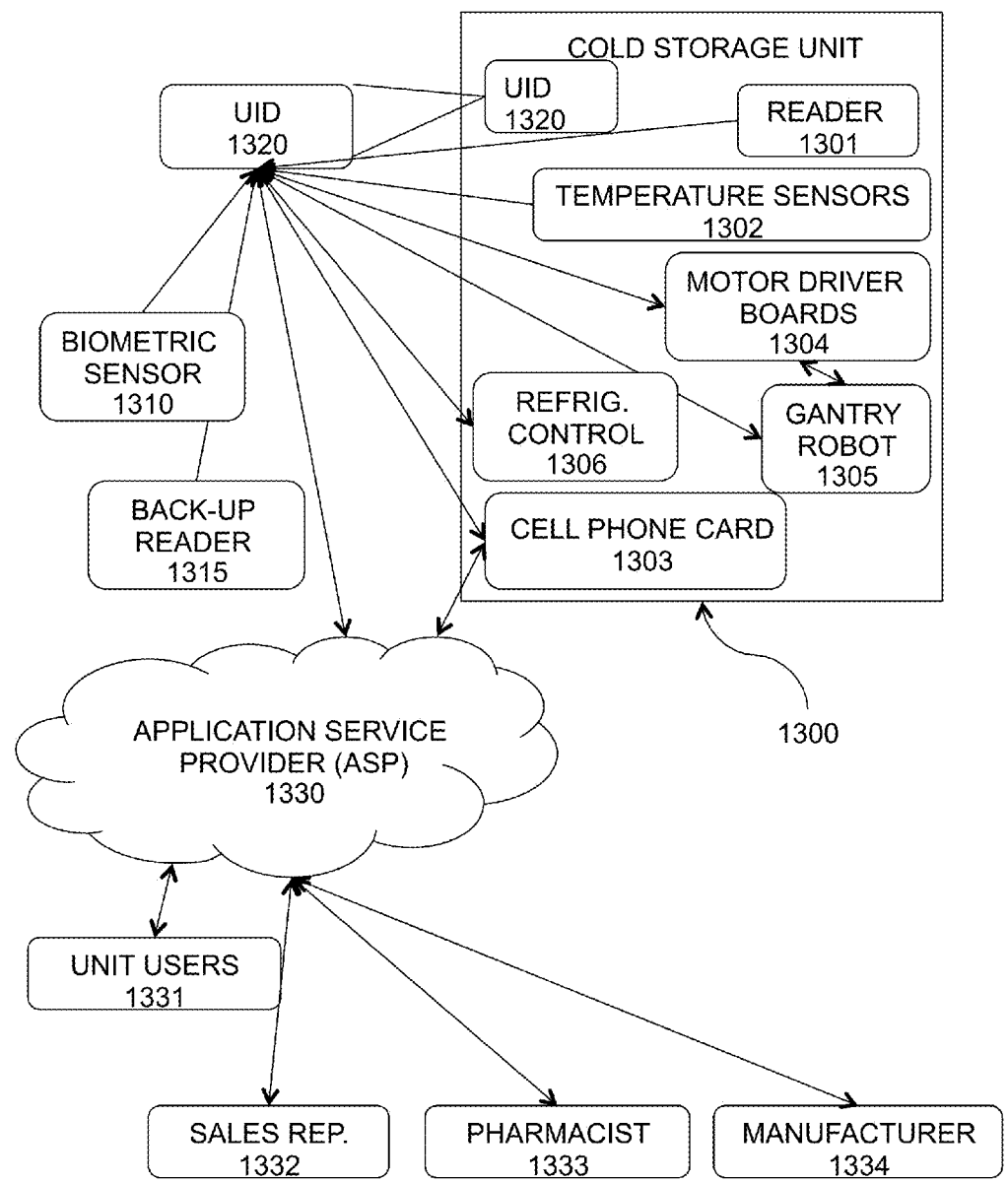
FIG. 13 is a flow diagram illustrating communication between cold storage unit, UID and ASP.

FIG. 13 contains a block diagram overview of communication lines between components of an exemplary automated cold storage system. The UID (1320) collects data at the unit (1300) from the Reader (1301), a Back-up Reader (1315) if necessary, the Temperature Sensors (1302), a Biometric Sensor (1310), motor driver boards (1304), refrigeration control (1306), and shares data with ASP (1330). If internet service is disrupted the UID can maintain communication with the ASP via a cell phone card (1303) imbedded in the unit. The UID (1320) and the motor driver boards (1304) provide the control for the Gantry Robot (1305). The ASP (1330) communicates, via a secure web site, with authorized users that include the unit user (1331) and other non-unit users for example, a sales representative (1332), a pharmacist 1333) and a manufacture (1334).

Application Service Provider (ASP)

The ASP, a cloud-based hosted environment, provides server space, to store and securely access data and information related to the unit, and software required to analyze and manage the data, information, and inventory.

The cold storage unit data captured by the ASP inventory management software includes product dispense and refill transactions, product reader scans, temperature sensor data, manually entered information via the UID, camera images, and bioscans. The ASP software analyses and stores the data. The ASP software captures product descriptor records for each product which includes product name, dosage, lot number, expiration date, quantity of the product in the unit, recommended temperature for storage, unit/compartment location, and provides additional information regarding the product including special handling requirements and links to manufacturer and/or CDC information. The ASP provided software may supplement UID software in the analysis of reader scans. The ASP further generates records related to dispense rate of product, spoilage frequency, historical temperature records, and product order frequency including average number of days required to receive new product.

Figure 14:
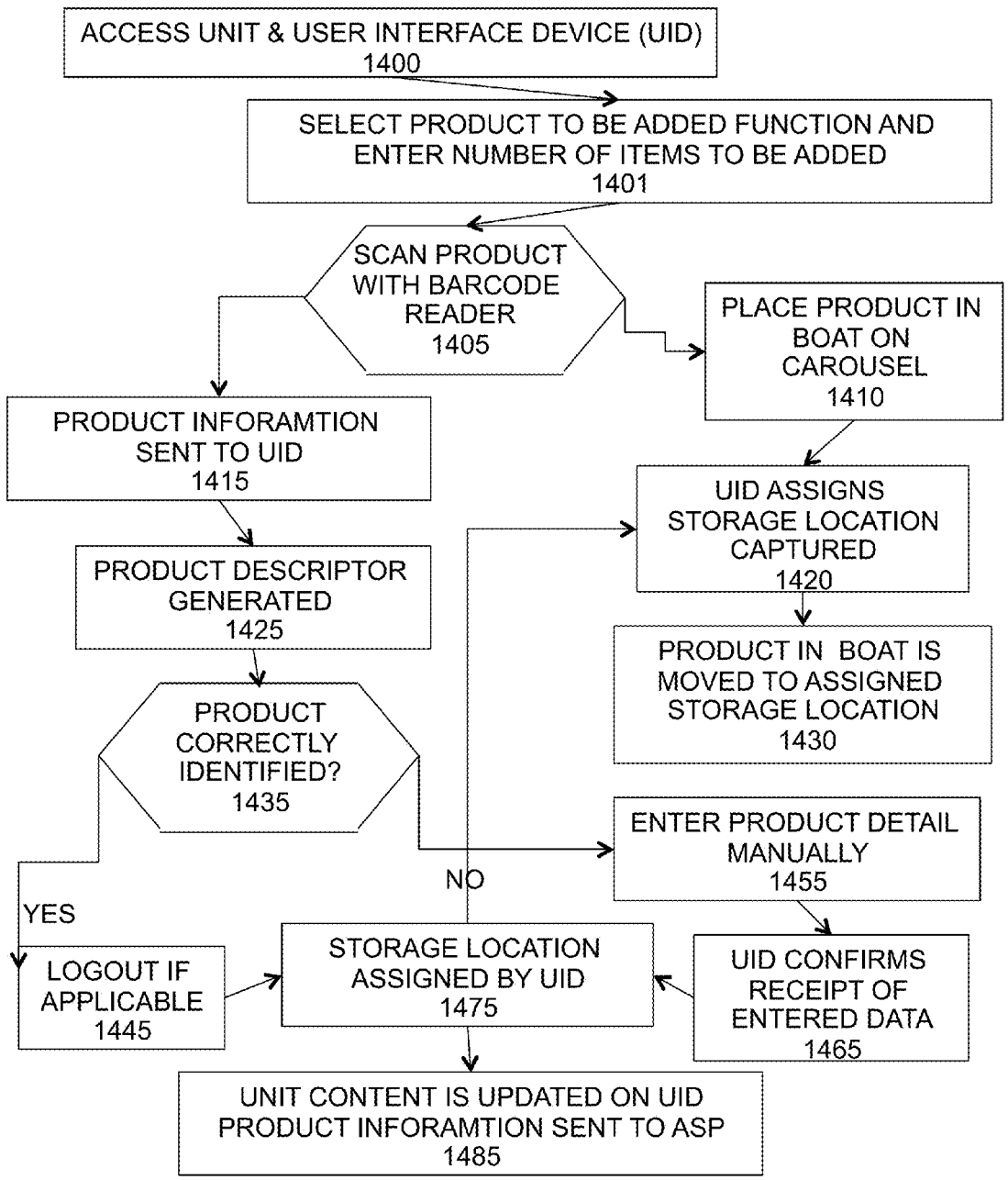
FIG. 14 is a flow diagram illustrating steps of an exemplary product intake process using a barcode reader.

An ASP inventory management function includes the tracking of add/dispense transactions of product to and from the unit. An exemplary protocol for addition of product to the unit using a barcode reader is shown in FIG. 14. An on-site user accesses the unit at the user interface, (step 1400), selects product to be added function and enter the number of items to be added (step 1401), scans the product barcode label with a barcode reader (step 1405) and places one product per boat carrier located in the carousel loading zone of the unit (step 1406). The number of boats provided in the loading zone will equal the number of items being added, equal to 2 in case of 1 item being added. The maximum number of boats accessible at one time in the loading zone of the carousel is 10. If the number of items being added exceeds ten the items automated system will load the first set of ten items into the unit and provide next set of empty boats for further loading. The top two levels of the cylindrical array of storage locations are preferentially selected for temporary storage of loaded items in order to expedite the process of loading larger quantities of product. As the product is being loaded into the boat carriers by the unit user (step 1410) the reader transmits the information to the UID (step 1415) wherein a product descriptor is generated (1425). The user confirms correct identification of the product (step 1435). If product is not correctly identified or information is missing the user enters the information (step 1455), UID confirms receipt of data (step 1465) the UID assigns a storage location (step 1475) and the UID product data base is updated (step 1485). If the product is correctly identified (step 1435) the user logs out (step 1445), the UID assigns a storage location (step 1475), and product data base is updated (step 1485). The UID assigned storage location for the product is captured (step 1420) and product is moved to the assigned location (step 1430). The product descriptor includes product name, dosage, lot number, expiration date, recommended temperature of storage, and any special handling requirements such as for example light sensitivity.

Dispensing of product in one embodiment may be captured by the unit when the on-site user selects the product to dispense on the unit content listing, displayed on the UID, and further selects the reason for dispensing including for example: dispense to patient, expired, spoiled in unit, transferred from unit, and discontinued. Optionally the user may also select, or enter manually, the name of the patient and/or doctor. The "dispense to patient" reason may be changed to post dispense spoilage if product is deemed to have spoiled prior to being administered to a patient.

Figure 15:
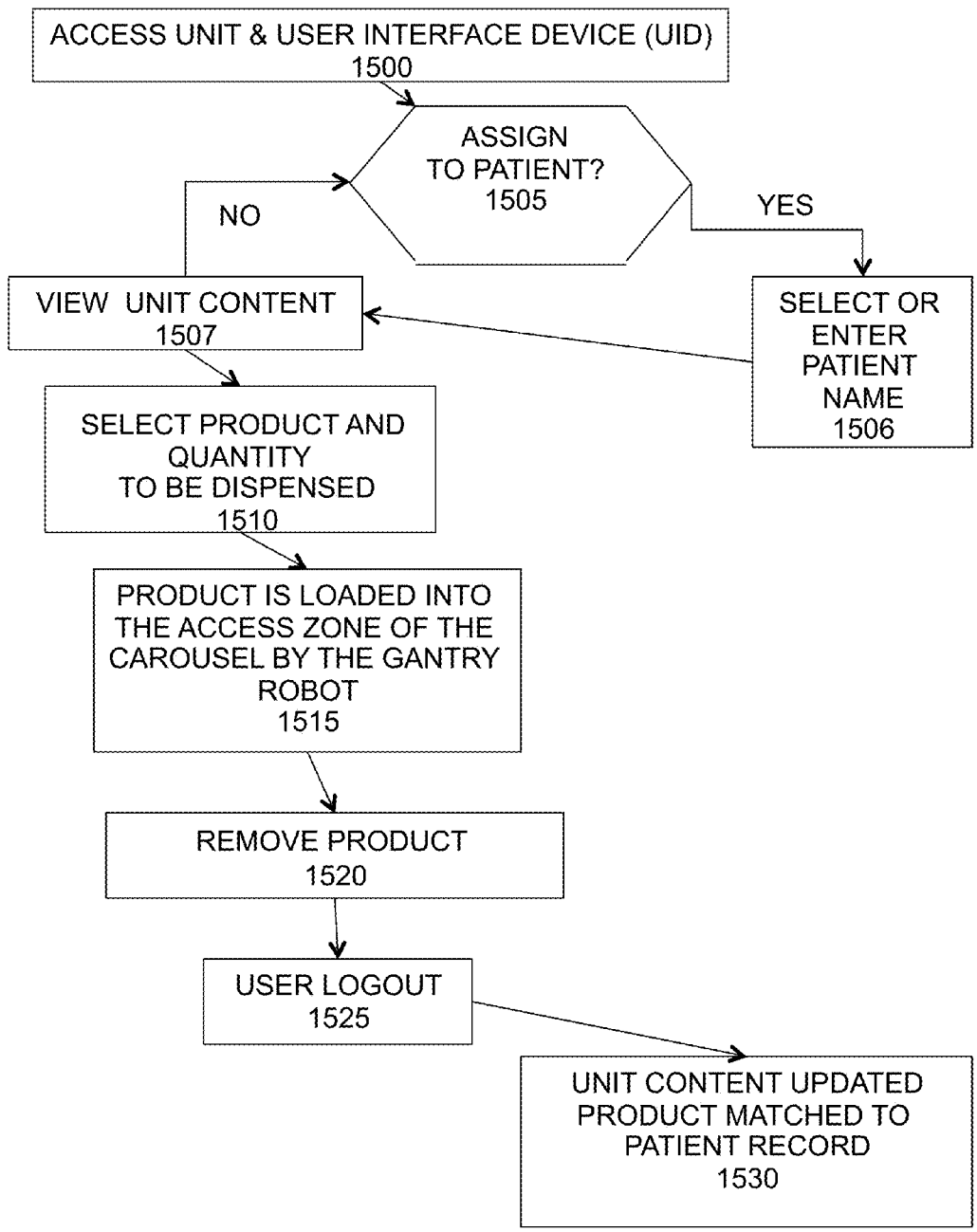
FIG. 15 is a flow diagram illustrating steps of an exemplary product dispense process.

An exemplary protocol flow diagram for dispensing of product from the unit is shown in FIG. 15. An on-site user access the unit and UID (step 1500) and selects if dispense is to be linked to patient (step 1505). If yes, name of patient is selected from patient listing or the patients name is entered (step 1506). If the product is not linked to patient, or patient name has been entered/selected in step 1506, the user proceed to view the unit content listing on the UID display (step 1507). The product and quantity to be dispensed is selected (step 1510) and the automated unit identifies the location(s) holding product and product(s) is loaded into the loading zone of the carousel by the gantry robot (step 1515). The user removes product from boat carrier(s) (step 1520), logs out (step 1525) and unit content is updated (step 1530).

Alerts

Alerting activities will emanate from the ASP hosted system and alerts will be delivered to pre-determined locations including the physical unit and/or specified phones, computers and email addresses. Alerts are generated by events associated with the physical unit including: temperature deviations from allowed temperature range, loss of power to the physical unit in the event of a power outage, lock malfunction, robotics or mechanical failure, and cooling system failure. Alerts are further generated by the inventory management software based on inventory deviations including expiration of product, about to expire product and low or depleted stock warnings. A customizable alert sent to the UID may include a visual and/or audio signal, unique to the type of an alert, and all information on the nature of the alert may be emailed or telephoned to a customized list of user contacts.

Figure 16:
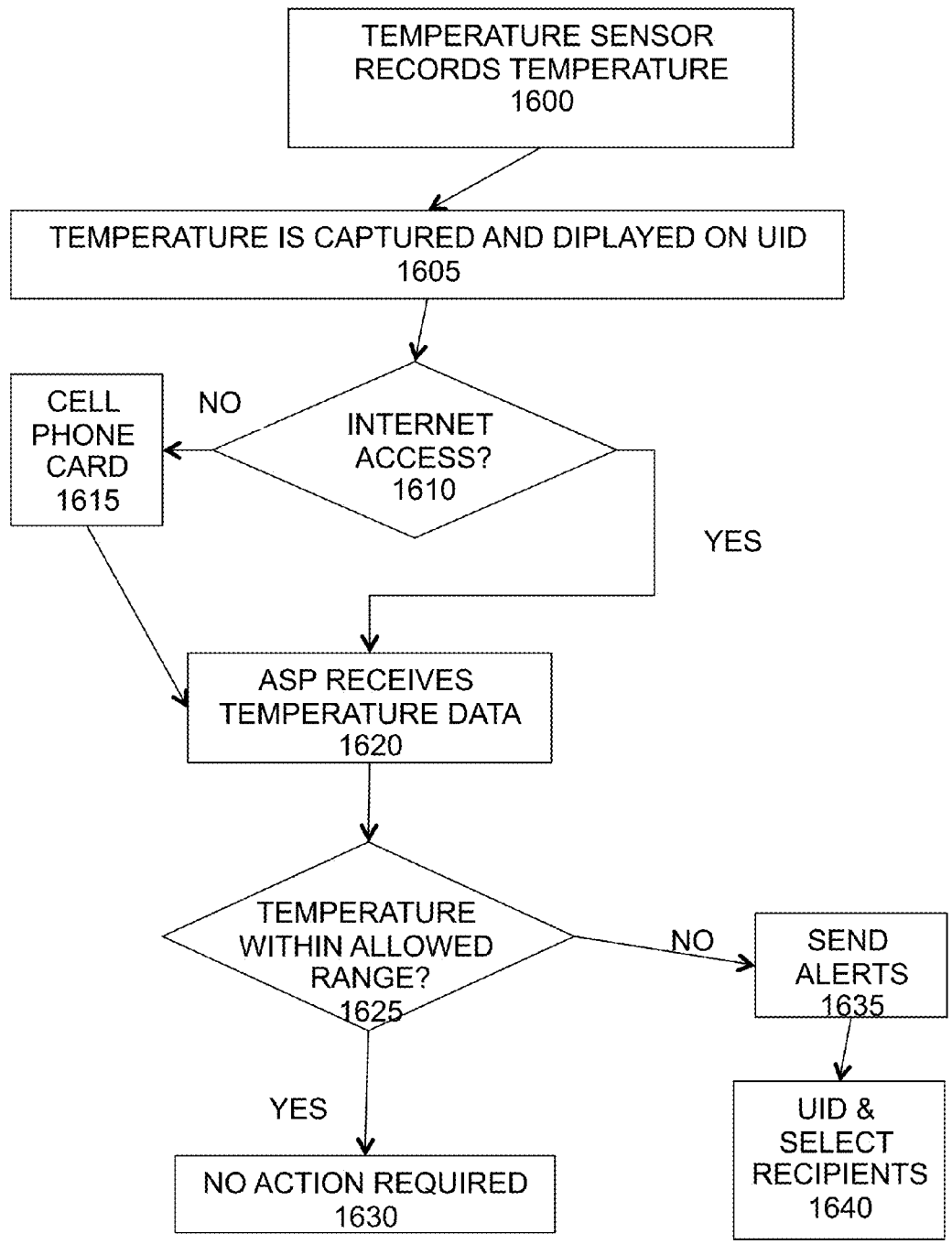
FIG. 16 is a flow diagram illustrating steps performed by the system in generating temperature deviation alert.

The ASP unit management software records and keeps historical data on the temperature of each compartment and the product contained within the compartment. FIG. 16 shows an exemplary flow diagram illustrating the steps taken to monitor temperature and send out alerts. The temperature is, recorded by the temperature sensors associated with each compartment and/or temperature zone (step 1600) and is sent to and displayed on the UID (step 1605). Upon confirming if internet access is available (step 1610), the UID transmits the temperature data, via the internet (step 1620) or a cell phone card (step 1616) if internet access is not available, to the ASP unit management software, and the temperature data is compared to the allowed storage temperature limits for that product (step 1625). If the temperature falls within these limits no action is taken (step 1630). If the temperature falls outside these limits an alert is generated (step 1635) and delivered to the UID and selected recipients emails and/or phone numbers (step 1640). The alert, which may include a visual and/or audio signal, received by the UID will display a temperature deviation warning with name and location of product and instruct the user to confirm the temperature deviation by comparing to temperature readout at the unit, and take action to transfer product to an alternate storage device if necessary. The alert is emailed or telephoned to the customized list of user contacts and includes all information on the nature of the deviation and instruct the recipient to follow user established protocol and take action to confirm product is properly stored.

The ASP database stores expiration date for each product within a unit and generates an alert when a product is within a select number of days from the expiration date or has expired. When a product expires it is critical to remove the product from the unit, not only to comply with TTSPP storage regulation, but to avoid the ultimate error of administering an ineffective product to a patient and endangering the patient's well being.

Figure 17:
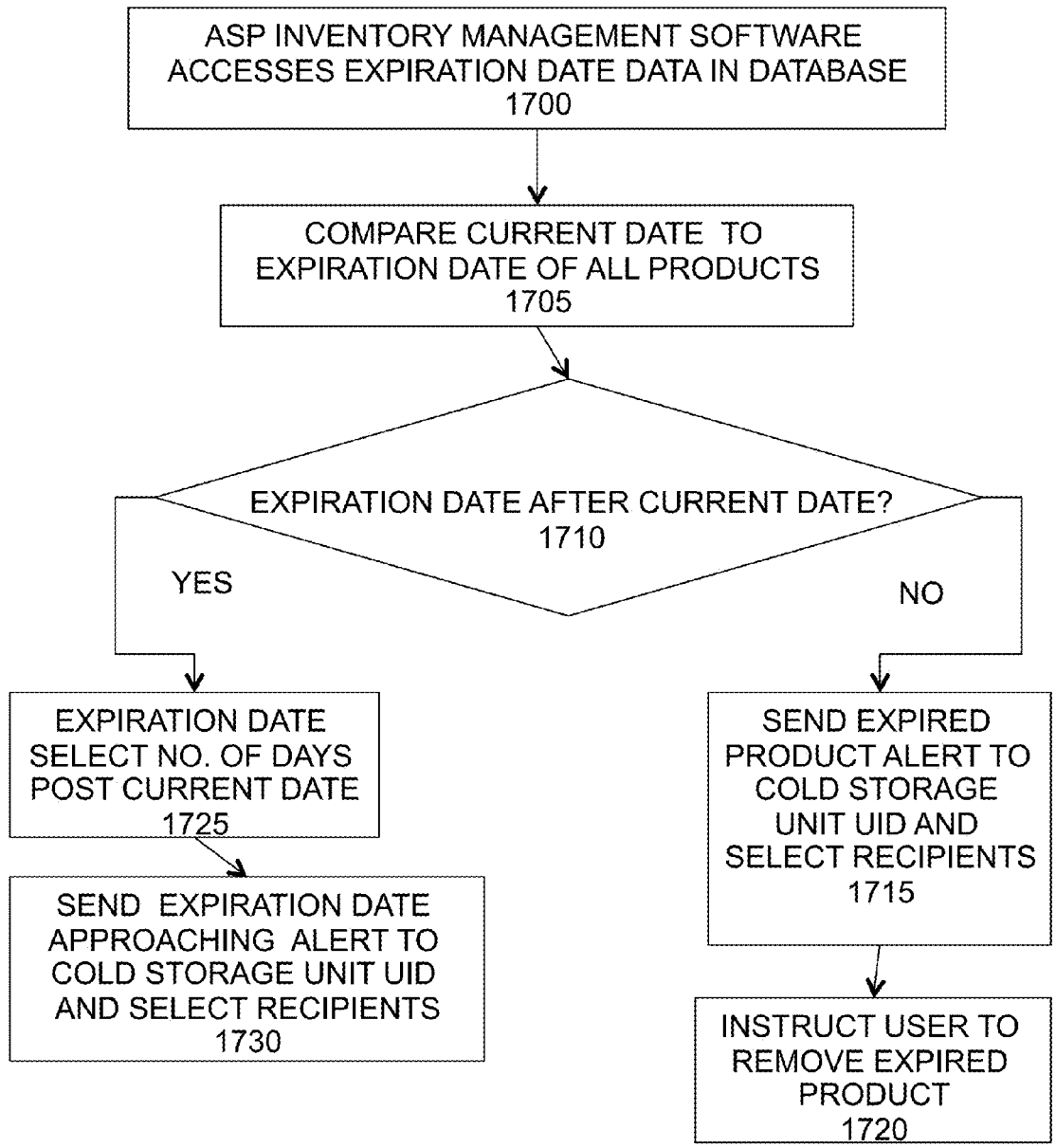
FIG. 17 is a flow diagram illustrating steps performed by the system in generating expiration of product alert.

FIG. 17 shows an exemplary flow diagram illustrating the steps taken to monitor the expiration dates of products and send out alerts. The ASP inventory management software accesses expiration date data in database (step 1700), comparing current date to expiration date (steps 1705 and 1710). If the expiration date is not after the current date, the product is expired and an expired product alert is sent to the UID and select recipients (step 1715), with optional audio and or visual alerts, instructing user to remove and dispose of expired product, providing product name, expiration date, lot number and unit/compartment location (step 1720). If a product expiration date is a select number of days post current date (step 1725) a different alert is sent to the UID and select users (step 1730), alerting the recipients that product is about to expire and to verify stock status and consider ordering more product. The select number of days post current date is customizable by the unit user and is based on the dispense rate of the product.

Figure 18:
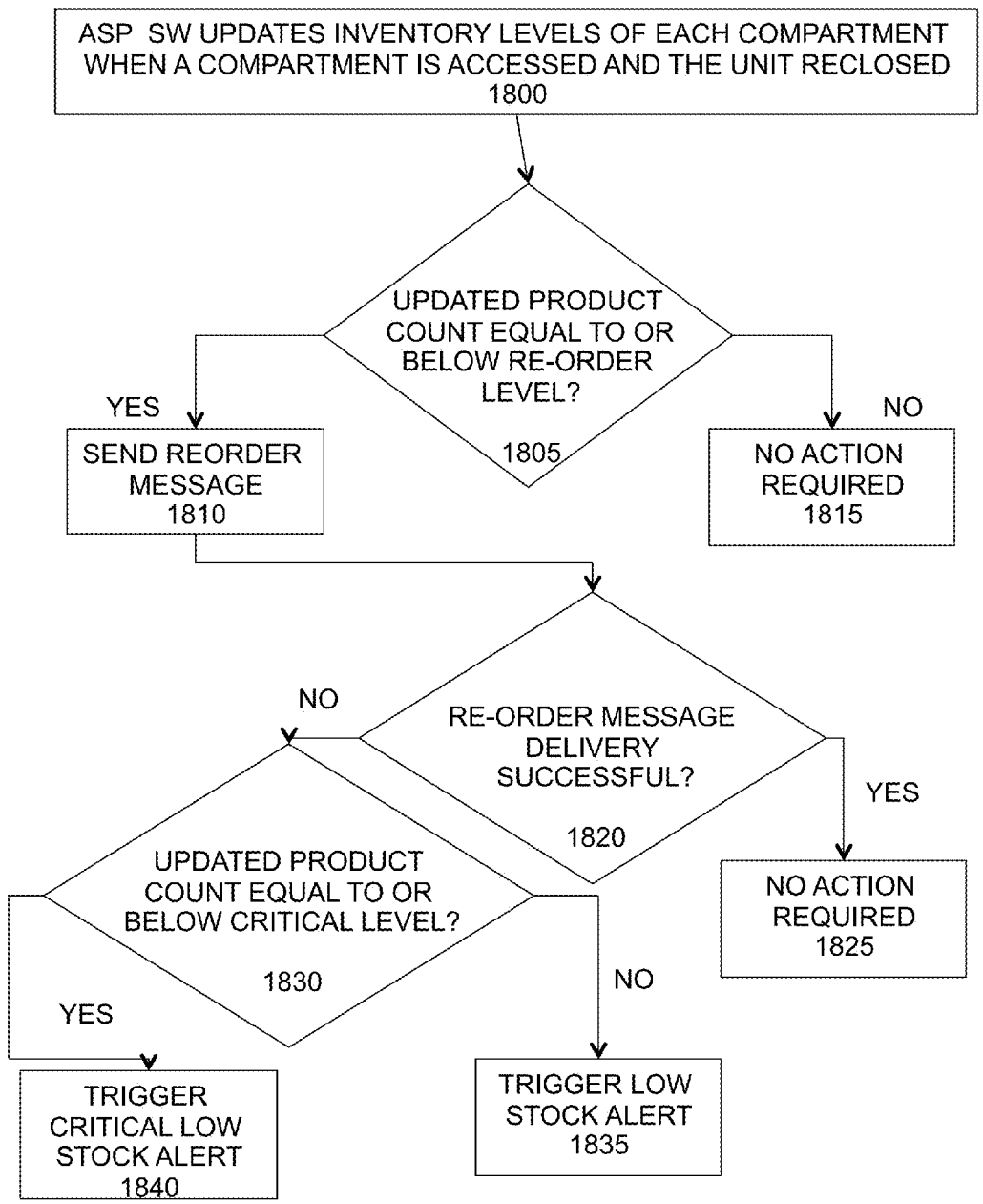
FIG. 18 is a flow diagram illustrating steps performed by the system in generating low stock of product alert.

The ASP inventory management software further sends out low stock alerts and reorder recommendations based on the captured data related to current inventory status of each unit, expiration dates of the products, and pre-determined re-order levels. FIG. 18 shown an exemplary flow diagram illustrating the steps taken to monitor product stock in the unit and send out alerts. The ASP inventory management software updates the inventory levels of each compartment every time a compartment is accessed and the unit is reclosed (step 1800). Inventory is decremented as product is dispensed and upon reaching or falling below a predetermined re-order level (step 1805), an order for additional product will be processed. If product count is greater than the re-order level count (step 1805) no action is required (step 1815). Should inventory levels fall to or below the predetermined re-order level a reorder message is sent (step 1810) to place or confirm if an order has been placed (step 1820). If the re-order message is not successful, an order was not placed, the system will determine if the product count is below a critical level (step 1830) and will generate a low stock alert if it is not below the critical level (step 1835) or a critical low stock alert (step 1840) if it is below the critical level. No action is required (step 1825) if an order is in place. A critical low may occur for a variety of reasons including: expected shipment has been delayed, sudden surge in usage in a single day that reduces inventory past the reorder point, and failure to process a re-order. The quantity of product that is re-ordered is calculated based on the difference between current inventory and the predetermined par level of inventory. The ASP inventory management software can be configured to reorder stock automatically.

Inventory Management

All inventory management functions are managed centrally by the ASP in a cloud based hosted environment. Communication with individual units occurs via the Internet and all authorized users have secure access to their designated units via the ASP website.

The ASP inventory management software captures transactions related to inventory of the cold storage unit and include stock and dispense transactions with reason for dispending of product. The dispense transactions may include for example: dispensed to patient, expired, spoiled in unit due to unit temperature deviations outside of recommended range, transferred from unit, and discontinued. Post a transaction the "dispensed to patient" transaction may be changed by the user to "post dispense spoilage" if product was not administered to patient and product has been deemed to have spoiled. The data is further used to establish historical records of product demand, to ascertain adequate stock is available as needed, avoid loss of product due to expiration/spoilage, and to optimize the frequency and timing for ordering product and the quantity of product to be ordered.

Figure 19:
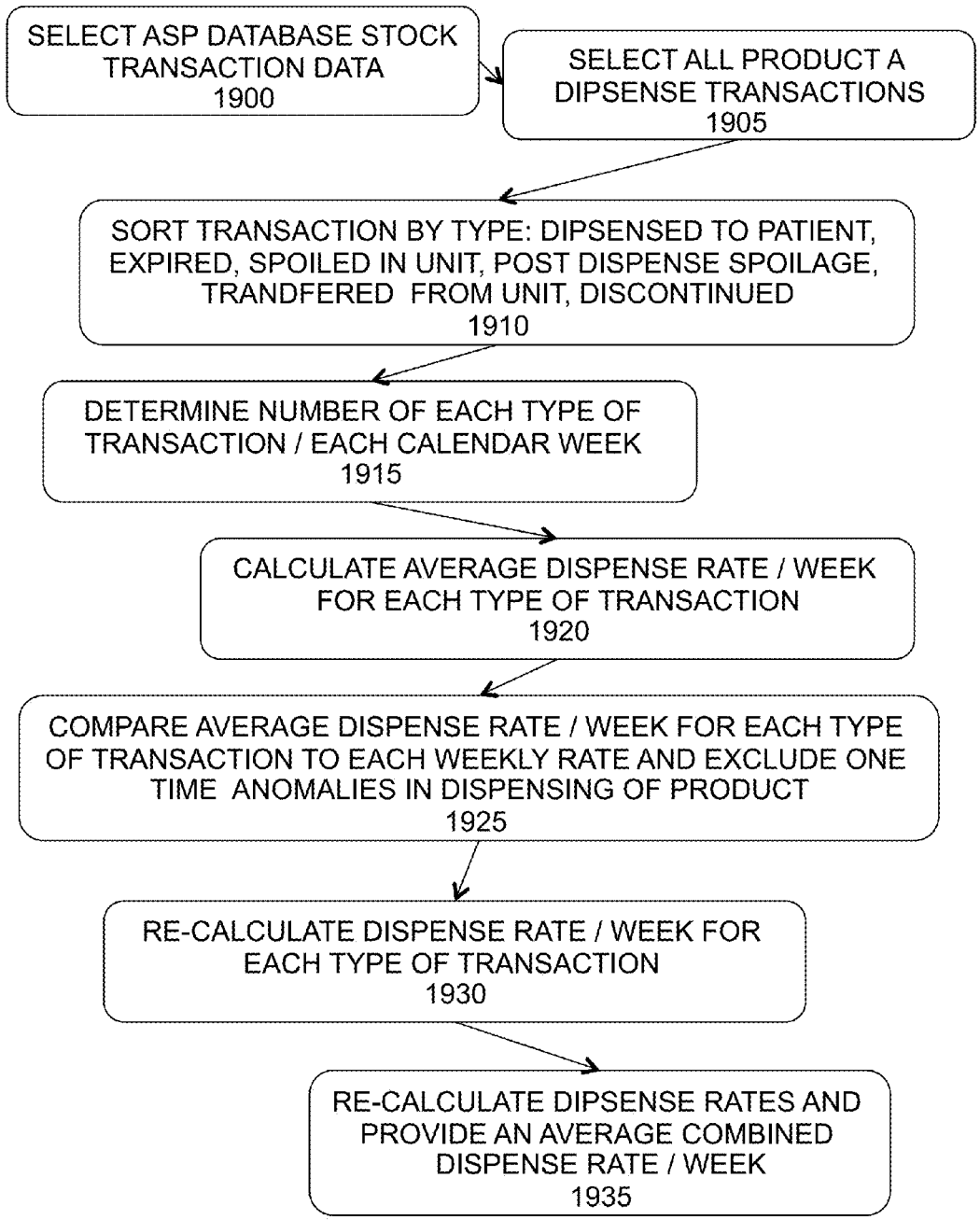
FIG. 19 is a flow diagram illustrating steps performed by the system in determining a product dispense rate.

A product dispense rate is determined by the ASP provided inventory management software to establish historical trends in use of product. Shown in FIG. 19 is an exemplary flow diagram for the process of determining dispense rates of product A. The ASP stored transaction data (step 1900) is first selected for dispensing transaction data (step 1905) which is then sorted by type (step 1910). The dispense rate for each type of dispensing transaction per calendar week (step 1915) and the average weekly rate for each type of dispensing transaction (step 1920) are determined. A comparison is made between the average dispense rate/week for each type of transaction to each weekly rate and one time anomalies in dispensing of product are excluded (step 1925). A corrected average dispense rate/week for each type of transaction is determined (step 1930) and a combined average of dispense rate/week for all transactions is established (step 1935). The exemplary dispense rates above are determined as a weekly rate. Further implementations of the dispense rate may be based on rates calculated for various time segments including a single day, several days, a month or year.

To ensure that a unit does not run out of stock and the optimal quantity of stock is ordered, par levels, re-order levels and critical lows of stock are determined and low stock alert are generated. The determination of the physical maximum inventory level, par level, re-order level and critical low inventory level may be made by an authorized administrator of the unit. Typically, these inventory points will be determined by an individual with access to information and reports on transaction statistics for the unit. As historical trends of product use are established for a specific unit the determination of the par levels may be adjusted to reflect the historical use of the product within a given time period and may also be adjusted for seasonal variations. The unit user may choose to adjust the rates based on their review of the historical transaction data or may request that the ASP provide estimated values as a service.

The quantity of product to be ordered is based on the predetermined par level which is a function of the number of products that can physically fit within the allotted compartments (physical maximum) in the unit, the shelf life of the product, a desired re-order frequency and the dispense rate of the product. For example a product with a shelf life of 90 days (i.e. expiration date is 90 days from the date of manufacture) and a dispense rate of 5 products per 10 days would allow the storage of a maximum of 45 products without having some of the product expire prior to use. Although the unit can physically accommodate 45 product units, the par level may be set significantly lower than 45 in order to have a desired shipment of product every two weeks. In this example, the par level may be set at 15, allowing room for variations in dispenses rate and product delivery. If the unit compartment can only accommodate 10 product units, the maximum par level in this exemplary case is set at 10.

The re-order level is used to trigger a product order. If the order is not placed for whatever reason, there is a chance that the product could completely stock out and reach an inventory count of zero generating a stock-out alert. For example if it takes two days to order and receive product and the current dispense rate for product is 5 per day, a re-order level of 10 would be the lowest product count to trigger re-order. If an order has not been placed and inventory is at or below the set re-order level of 10, a low stock alert will be issued. Further, if the inventory level has reached a predetermined critical low level, a low stock alert would be issued. In keeping with the example, if the critical low level is determined to be 4 (less than a day's supply of product) and that inventory level is reached prior to the new shipment arriving, a low stock alert is issued. Preferably the re-order level will be set at a higher count, for example 20 in this exemplary case, to adjust for delays in placement of order and dispense rate variations.

The authorized user of a unit has access to reports (preferably HIPPA compliant), provided by the ASP inventory management software, that ascertain compliance with regulatory requirements, and allow the user to review and optimize protocols of handling and ordering of product. The reports may include: current inventory of product with expiration dates; quantity of product dispensed, by type of dispensing and/or total dispensed, for a selected time period such as day, week month year; dispense rate and type by date, percentages of product administered and percent product lost due to expiration, spoilage in unit, spoilage outside of unit; alert reports detailing any inventory and/or temperature alerts that have been generated over a given period of time.

An authorized user further has access to reports on regional inventory data available through the ASP database wherein the report may include: type and quantity of product administered by location such as a local region defined by community or city, a state, and/or country within a selected time period; and dispense rate and type by date, percentages of product administered and percent product lost due to expiration, spoilage in unit, spoilage outside of unit. Fluctuating supply demands for time and temperature sensitive pharmaceuticals (TTSPS) give rise to a need for timely communication between the unit user, a point of care provider, manufacturers, distributors, sales representatives and others managing the flow of the TTSPS. The ASP inventory management software provides such a communications network, via a web interface, delivering user profile customized access to reports related to TTSPS inventory transactions. A manufacture of product "A", for example, can have access to product "A" reports. Reports may include: quantity of product administered in by date and/or by location such as a local region defined by community or city, a state, and/or country within a selected time period; percentages of product administered and percent product lost due to expiration, spoilage in unit, spoilage outside of unit for a selected location; number of units within select location or region distributing product "A"; and low stock of product "A" alerts per unit and/or region.

A distributor and/or product representative can have access to reports on products that they distribute and/or represent. Reports may include: quantity of product dispensed to patient by date and/or by location such as a local region defined by community or city, a state, and/or country within a selected time period; percentages of product dispensed to patient and percent product lost due to spoilage or expiration.

Figure 20A:
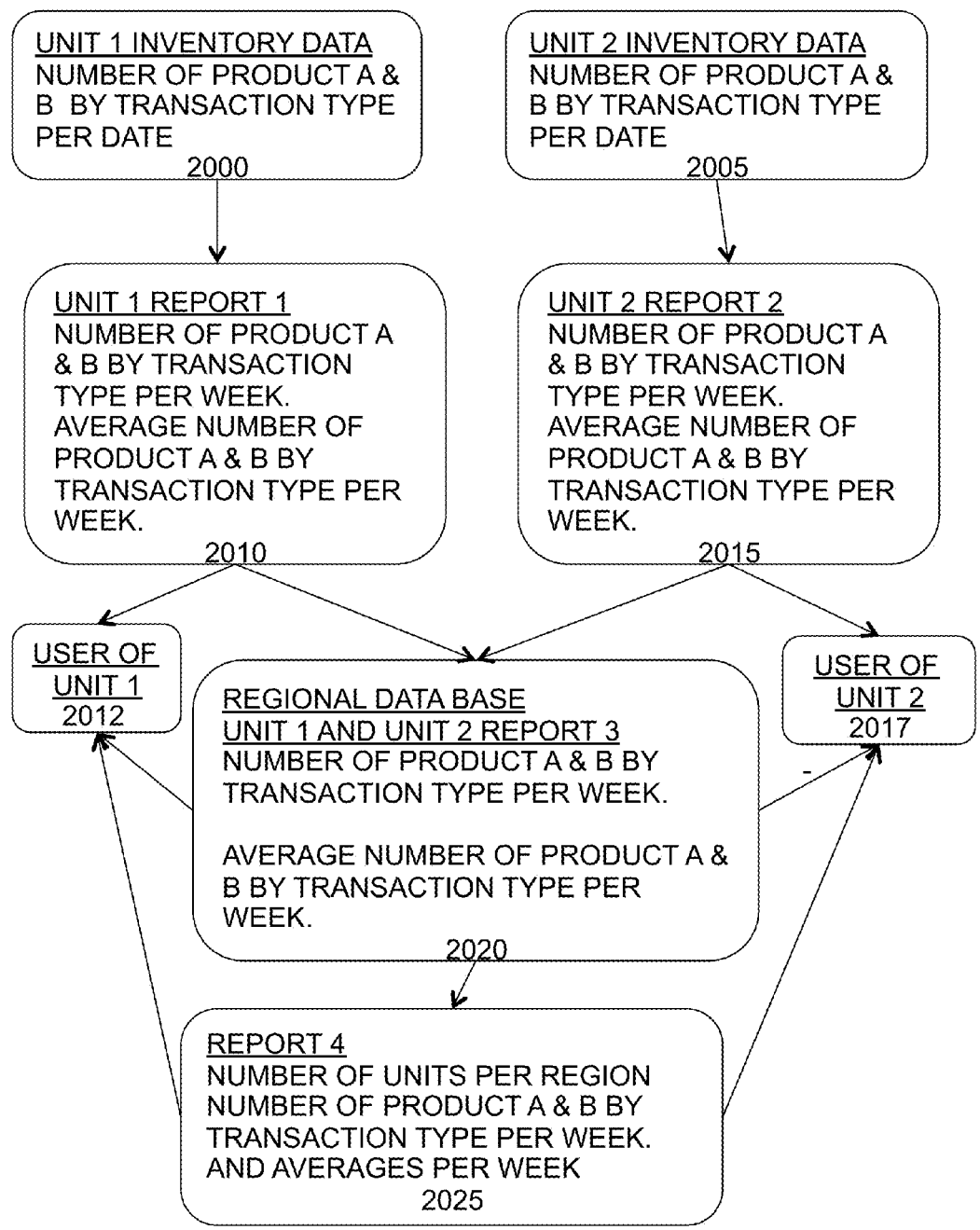
FIGS. 20A and 20B is a flow diagram illustrating access to inventory reports based on user profile.
Figure 20B:
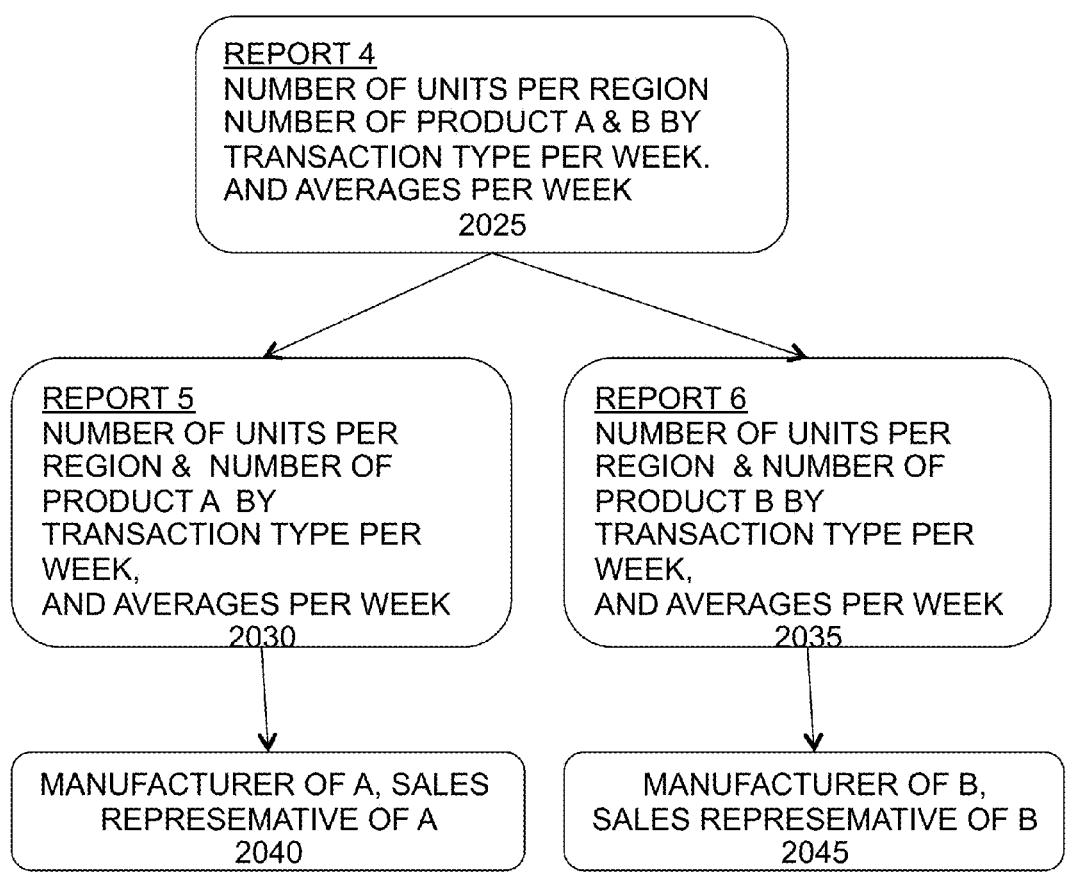

FIG. 20A and FIG. 20B illustrate by way of an example the generation of, and user access to, reports on products A and B based on a time period of one week. Unit 1 and Unit 2 transaction data (steps 2000 and 2005) is used to generate a report for each unit, Unit 1 Report 1 and Unit 2 Report 2 accessible to the unit's users, (2012) and (2017), and includes the number of products stocked or dispensed per week by transaction type. The reports and data are merged in a regional database (2020) and provide unit user, (2012) and (2017), with regional data report, Report 4 (2025). The regional data is broken down by product type, Report 5 for exemplary product A, (2030), and Report 6 for exemplary product B6, (2035), for reporting to for example manufactures and sales representatives, of product A (2035), and of product B (2040).

Figure 21:
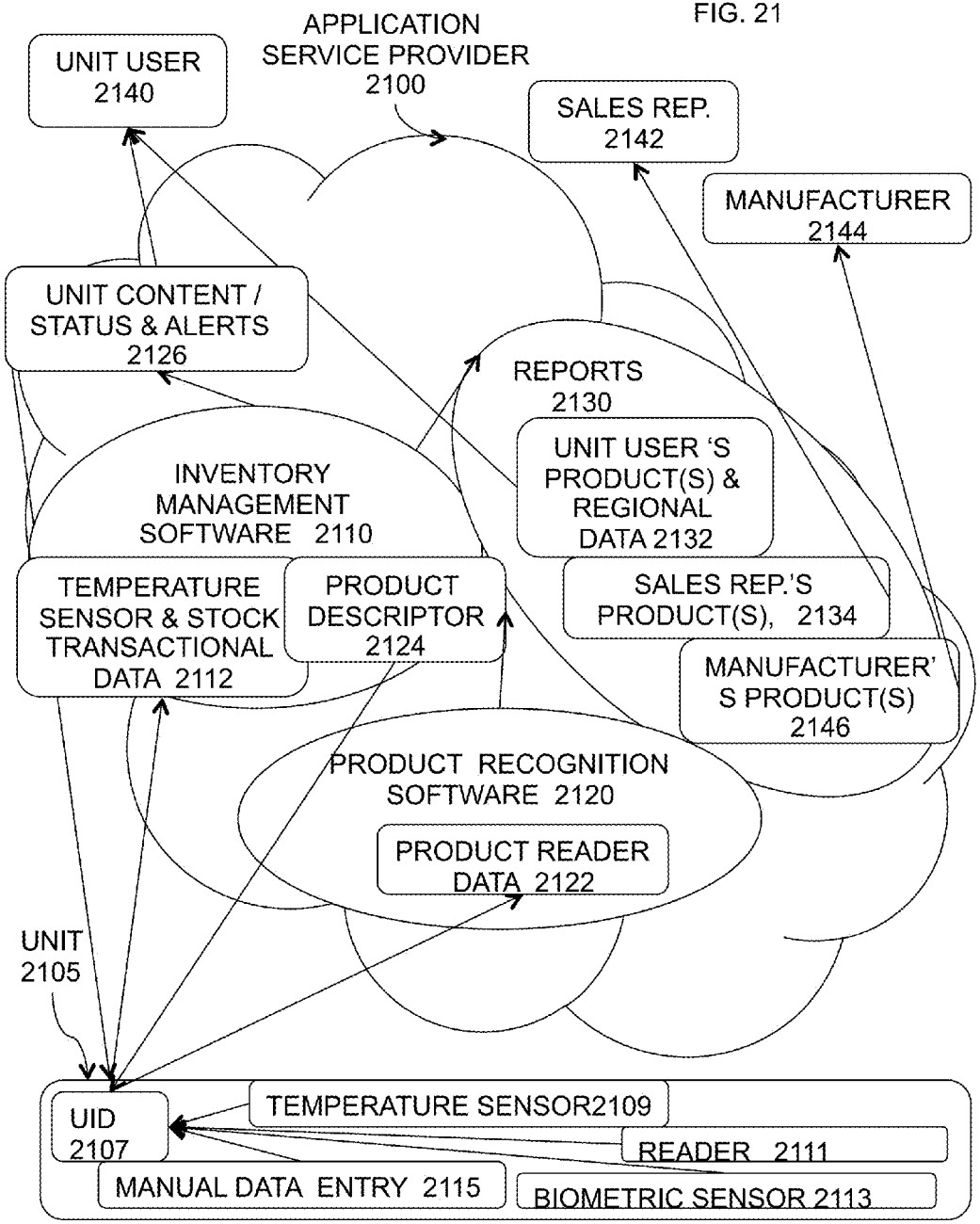
FIG. 21 is a block diagram illustrating the various functions provided by the Application Service Provider.

FIG. 21 illustrates by way of example some of the functions provided by the ASP. The ASP (2100) utilizes the Inventory Management Software (2110) and Product Recognition Software (2120) to capture and analyze data received from the Unit (2105) to generate Reports (2130) made available by report type (2132, 2134, and 2146) to the Unit User (2140), Sales Representative (2142), and Manufacturer (2144). The Unit (2105 UID (2107) captures data from a Temperature Sensor (2109, Readers 1 and 2 (2111), Biometric Sensor (2113) and manually entered data (2115). The Product Recognition Software (2120) captures and analyze the Product Reader Data (2122) and generates a Product Identifier (2124) that is used in combination with the Temperature Sensor & Stock/Dispense Data (2112 by the Inventory Management Software (2110) to generate Unit Content/Status and Alerts (2126) also displayed on the UID (2107).

In further embodiments of the ASP provided inventory management software an automatic customizable product order/reorder protocol may be implemented in response to low stock alerts. Re-order messages will be directed to one or more parties depending on customized preferences. These messages for example could flow to a manufacturer, a distributor, a physician's re-ordering system or some combination of two or more. Re-order messages are available in a variety of message formats including, but not limited to, EDI and HL7.

The ASP hosted system will provide an interface to other computer systems that require information directly. A doctor's office may desire an interface to provide dispense data to confirm the product dispensed and/or re-ordering information to process through an existing re-order process. Interface messages are available in a variety of message formats including (but not limited to) EDI and HL7.

Since modifications will be apparent to those of skill in this art, it is intended that this invention be limited only by the scope of the appended claims.

All of the articles and methods disclosed and claimed herein can be made and executed without undue experimentation in light of the present disclosure. While the articles and methods of this invention have been described in terms of preferred embodiments, it will be apparent to those of skill in the art that variations may be applied to the articles and methods without departing from the spirit and scope of the invention. All such variations and equivalents apparent to those skilled in the art, whether now existing or later developed, are deemed to be within the spirit and scope of the invention as defined by the appended claims. It will also be appreciated that computer-based embodiments the instant invention can be implemented using any suitable hardware and software.

All patents, patent applications, and publications mentioned in the specification are indicative of the levels of those of ordinary skill in the art to which the invention pertains. All patents, patent applications, and publications are herein incorporated by reference in their entirety for all purposes and to the same extent as if each individual publication was specifically and individually indicated to be incorporated by reference in its entirety for any and all purposes.

The invention illustratively described herein suitably may be practiced in the absence of any element(s) not specifically disclosed herein. Thus, for example, in each instance herein any of the terms "comprising", "consisting essentially of", and "consisting of" may be replaced with either of the other two terms. The terms and expressions which have been employed are used as terms of description and not of limitation, and there is no intention that in the use of such terms and expressions of excluding any equivalents of the features shown and described or portions thereof, but it is recognized that various modifications are possible within the scope of the invention claimed. Thus, it should be understood that although the present invention has been specifically disclosed by preferred embodiments and optional features, modification and variation of the concepts herein disclosed may be resorted to by those skilled in the art, and that such modifications and variations are considered to be within the scope of this invention as defined by the appended claims.

We claim:

1. An automated temperature sensitive product cold storage unit comprising:
    (i) a housing having at least one product access panel for loading and/or retrieving temperature sensitive products stored in the cold storage unit;
    and disposed in the housing, (ii) a loading zone configured to receive one or more carriers each adapted to hold a temperature sensitive product, wherein the loading zone is accessible via the access panel, when open;

(iii) a storage area framework having a plurality of independently addressable storage bays each configured to store a temperature sensitive product or a carrier for a temperature sensitive product;

(iv) at least one accessible, insulated, temperature-controlled cold storage zone that bounds a volume that encloses at least a portion of the plurality of independently addressable storage bays in the storage area framework, which cold storage zone comprises at least one temperature sensor;

(v) a robot to transport temperature sensitive products, or carriers for temperature sensitive products, within the cold storage unit;

(vi) a reader to identify temperature sensitive products loaded into or removed from the cold storage unit;

(vii) a computer configured to control operation of the cold storage unit, movement of the robot, containers and carriers, and storage and dispensing of temperature sensitive products from the cold storage unit;

(viii) a refrigeration unit connected to the cold storage zone; and wherein:

(a) the cold storage unit further comprises a plurality of carriers; and/or (b) the loading zone is disposed in a carousel that can be moved in relation to the access panel, optionally (A) to provide an empty carrier into which a temperature sensitive product can be loaded, or (B) to allow a temperature sensitive product to be removed from the carrier in which it is held, wherein optionally the carousel rotates atop a base disposed atop the storage area framework, optionally a cylindrical array, to position one or more empty carriers within the loading zone or to position one or more filled temperature sensitive products within the unit for transport to a storage location; and/or (c) the storage area framework is a cylindrical array that comprises a hollow central core and a plurality of stacked levels of storage bays disposed about the periphery of the hollow cylindrical array, wherein the storage bays are accessible to the robot through the hollow central core, wherein the cylindrical array optionally comprises a series of substantially parallel vertical members, and optionally substantially parallel horizontal members, spaced to produce the plurality of storage bays, each of which is configured to accommodate a temperature sensitive product to be stored or a carrier therefor; and/or (d) each of the plurality of storage bays defines a rectangular box having an open end that is accessible to the robot to insert and remove a temperature sensitive product or carrier therefrom, wherein each storage bay optionally comprises a series of spaced, substantially parallel vertical members, and optionally substantially parallel horizontal members, wherein the vertical members contain ridges to engage and suspend carriers for temperature sensitive products; and/or (e) the robot is an R, Θ, Z gantry robot, optionally an R, Θ, Z gantry robot centrally disposed in a hollow core of a cylindrically arrayed storage area framework, wherein the robot comprises pair of robotic arms that can move vertically along a central shaft that defines a Z axis of the gantry robot and can rotate the arms in relation to the storage area framework to retrieve or deliver temperature sensitive products, or carriers therefore, to and from the loading zone and/or a different storage bay, optionally wherein the robot comprises two opposing arms, 180° apart, each comprising a central rod positioned within a rectangular sleeve casing and fitted with an adaptor configured to hook and pull a carrier into the arm's sleeve casing after forming a fit with a latch on the carrier, wherein each rod optionally is fitted with a sensor, optionally, comprising a light beam generator and a reflected light detector, in communication with the computer in order to control horizontal and vertical movement of the central rod to guide connection with the latch on a carrier; and/or (f) the cold storage unit comprises an a accessible, insulated, temperature-controlled cold storage zone, wherein the cold storage zone bounds a volume that encloses the plurality of storage bays in the storage area framework and wherein each cold storage zone comprises at least one temperature sensor; and/or (g) the cold storage unit comprises at least two stacked, accessible, insulated, temperature-controlled cold storage zones, wherein each cold storage zone comprises at least one temperature sensor and bounds a volume that encloses a portion of the plurality of storage bays in the storage area framework separate from the other cold storage zone(s), wherein any two adjacent cold storage zones are connected by a key way seal and key way plug that physically and thermally separate, and provide access between, the two cold storage zones; and/or (h) each storage bay is configured to receive a carrier adapted to (A) hold a temperature sensitive product and (B) be engaged by the robot for movement inside the housing; and/or (i) an accessible, insulated, temperature-controlled cold storage zone comprises temperatures between about 1° C. and about 12° C., and/or between about −100° C. and about 0° C.; and/or (j) the cold storage unit further comprises a backup power supply, optionally one or more batteries; and/or (k) the reader is a barcode reader; and/or (l) the cold storage unit further comprises an optionally activated security interface to control internal access to the cold storage unit, wherein such access control optionally comprises a login code verification and/or a biometric sensor scan; and/or (m) the access panel comprises a pair of sliding doors positioned above the loading zone, wherein the doors optionally slidingly separate from a central point above the loading zone; and/or (n) at least some of the carriers for temperature sensitive products each include a latch configured to be releasably but connectedly engaged by an adaptor of a robotic arm; and/or (o) at least some of the carriers for temperature sensitive products each include at least one opening through which a light beam can be shone and/or reflected to assess whether the carrier has a temperature sensitive product stored therein.

2. An automated temperature sensitive product cold storage unit of claim 1, wherein the presence of the product within a carrier is detected by a light beam generator positioned outside an outer perimeter of the carousel, and a sensor located outside an inner portion of the carousel.

3. An automated temperature sensitive product cold storage unit of claim 1 that comprises at least two stacked, accessible, insulated, temperature-controlled cold storage zones, wherein each cold storage zone comprises at least one temperature sensor and bounds a volume that encloses a portion of the plurality of storage bays in the storage area framework separate from the other cold storage zone(s), wherein any two adjacent cold storage zones are connected by a key way seal and key way plug that physically and thermally separate, and provide access between, the two cold storage zones.

4. An automated temperature sensitive product cold storage unit of claim 1 that comprises at least two stacked, accessible, insulated, temperature-controlled cold storage zones, wherein each cold storage zone comprises at least one temperature sensor and bounds a volume that encloses a portion of the plurality of storage bays in the storage area framework separate from the other cold storage zone(s), wherein any two adjacent cold storage zones are connected by a key way seal and key way plug that physically and thermally separate, and provide access between, the two cold storage zones, wherein the key way plug comprises a disk that sits on the key way seal within the insulation layer, forming an insulating barrier between the two adjacent cold storage zones and is free to rotate with the gantry robotic arms when the robot is an R, 0, Z gantry robot.

5. An automated temperature sensitive product cold storage unit according to claim 1 wherein the temperature of each cold storage zone is monitored by one or more temperature sensors and temperature data from the temperature sensors is stored in a memory associated with the computer.

6. An automated temperature sensitive product cold storage unit according to claim 5 wherein the cold storage zone temperature(s) is(are) displayed on a display panel visible to a user of the cold storage unit.

7. An automated temperature sensitive product cold storage unit according to claim 1 that further comprises a user interface device (UID), optionally a tablet computing device docked on the cold storage unit, in communication with the computer and an application service provider (ASP), wherein the tablet computing device, if present, optionally comprises (A) a touch screen to display, enter, and/or access information and (B) an internet connection that uses a local internet router or a cell phone card embedded in the cold storage unit.

8. An automated temperature sensitive product cold storage unit according to claim 7 wherein the UID is configured to display a home screen showing information on the cold storage unit and its contents, wherein the information displayed on the home screen optionally includes one or more of: names, dosages, quantities, and/or expiration dates of temperature sensitive products stored in the cold storage unit; current temperature of the cold storage zone(s); alerts; and/or order status of additional temperature sensitive products ordered for storage in the cold storage unit.

9. An automated temperature sensitive product cold storage unit according to claim 7 wherein by selecting on the UID a particular displayed temperature sensitive product further information about the temperature sensitive product is displayed on the UID, such further information comprising at least one of the following: location of individual unit(s) of such temperature sensitive product by storage bay, cold storage zone, and/or temperature zone; temperature history; lot number(s); expiration date(s); and/or internet links to additional information about the temperature sensitive product.

10. An automated management system for temperature sensitive products, the system comprising:
(i) an automated temperature sensitive product cold storage unit according to claim 1 in communication with an application service provider (ASP);
(ii) a UID to provide user access to the cold storage unit and information regarding its contents and/or operation;
(iii) a data collection system wherein the cold storage unit's computer or UID and/or the ASP capture and store data related to the cold storage unit and temperature sensitive products stored in the cold storage unit; and
(iii) an ASP, wherein the ASP is a cloud-based hosted environment that provides at least one service selected from the group consisting of inventory management, system administration, alerting, and reporting;
wherein inventory management comprises:
(a) tracking of inventory of temperature sensitive products stored in the cold storage unit;
(b) tracking of temperature sensitive product dispensing and stocking transactions in the cold storage unit;
(c) tracking expiration dates of individual temperature sensitive products stored in the cold storage unit;
(d) automated transmission of re-order messages when temperature sensitive products become depleted;
(e) automated transmission of expired product and/or about-to-expire messages; and
(f) providing product and/or regulatory information about temperature sensitive products contained in temperature sensitive products stored or to be stored in the cold storage unit.

11. A system according to claim 10 wherein system administration comprises one or more of:
(i) monitoring the cold storage unit location information; and/or
(ii) monitoring information related to the physical status of the cold storage unit, including function, power, temperature, and/or temperature sensor data; and/or
(iii) maintaining communication between a cold storage unit's computer, UID, ASP, and cell phone card applications; and/or
(iv) maintaining optionally secure access to the cold storage unit and ASP; and/or
(v) facilitating unit maintenance.

12. A system according to claim 10 wherein alerting comprises transmission of alerting messages to one or more pre-selected recipients and/or a UID that relate to one or more events selected from the group consisting of a cold storage zone temperature excursion that exceeds a preset threshold, inventory of a particular type of temperature sensitive product stock is depleted or reaches a preset lower limit, a temperature sensitive product has expired or will expire within a preset number of days, and a power disruption to the cold storage unit.

13. A system according to claim 10 wherein reporting comprises providing an authorized user access to information and reports related to status of the cold storage unit, product information, regulatory requirements, or inventory management, wherein the access is provided via a secure website and is optionally customizable based on a user profile.

* * * * *